United States Patent
Ookubo

(10) Patent No.: US 6,614,227 B2
(45) Date of Patent: Sep. 2, 2003

(54) SCANNING MICROWAVE MICROSCOPE CAPABLE OF REALIZING HIGH RESOLUTION AND MICROWAVE RESONATOR

(75) Inventor: Norio Ookubo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/998,301

(22) Filed: Dec. 3, 2001

(65) Prior Publication Data

US 2002/0067170 A1 Jun. 6, 2002

(30) Foreign Application Priority Data

Dec. 4, 2000 (JP) ........................................ 2000-368879

(51) Int. Cl.$^7$ .............................. G01V 3/00; G01V 3/08; G01B 5/28; G01N 23/00
(52) U.S. Cl. ........................ 324/316; 324/635; 73/105; 250/306; 250/206; 250/208
(58) Field of Search ................................ 324/635, 316; 73/105; 250/306; 333/206, 208

(56) References Cited

U.S. PATENT DOCUMENTS

| | | | | |
|---|---|---|---|---|
| 4,812,763 A | * | 3/1989 | Schmalbein | ................ 324/316 |
| 5,821,410 A | * | 10/1998 | Xiang et al. | ................... 73/105 |
| 5,900,618 A | * | 5/1999 | Anlage et al. | ............ 250/201.3 |
| 6,173,604 B1 | * | 1/2001 | Xiang et al. | ................... 73/105 |
| 6,376,836 B1 | * | 4/2002 | Anlage et al. | ................ 250/234 |

OTHER PUBLICATIONS

Tabib–Azar et al.; Evanescent Microwaves: a novel super–resolution noncontact nondestructive imaging technique for biological applications; IEEE Transactions on Instrumentation and measurement, vol. 48, No. 6, Dec. 1999; pp. 1111–1116.*

Chen Gao et al., "High Spatial Resolution Quantitative Microwave Impedance Microscopy by a Scanning Tip Microscope Near–field Microscope", Appl. Phys. Lett 71 (13), pp. 1872–1874, Sep. 1997.

Chen Gao et al., "Quantitative Microscope Near–field Microscope of Dielectric Properties", Review of Scientific Instruments, vol. 69, No. 11, pp. 3846–3851, Nov. 1998.

C.P. Vlahacos et al., "Near–field Scanning Microwave Microscope with 100$\mu$m Resolution" Appl: Phys. Lett. 69 (21), pp. 3272–3274, Nov. 1996.

C.P. Vlahacos et al., "Quantitative Topographic Imaging Using a Near–field Scanning Microwave", Appl. Phys. lett 72(14), pp. 1778–1780, Apr. 1998.

D.E. Steinhauer et al., "Imaging of Microwave Permittivity, Tunability, and Damage Recovery in (Ba,Sr)TiO$_3$ Thin Films", Appl. Phys. Lett 75(20), pp. 3180–3182, Nov. 1999.

(List continued on next page.)

*Primary Examiner*—Andrew H. Hirshfield
*Assistant Examiner*—Wasseem H. Hamdan
(74) *Attorney, Agent, or Firm*—Young & Thompson

(57) ABSTRACT

In a scanning microwave microscope including a microwave resonator, an exciting unit for exciting the microwave resonator, a first detecting unit for detecting a first detection amount relating to a resonant state of the microwave resonator, a sharp end coupled to a center conductor of the microwave resonator, and a display unit for displaying the first detection amount while a sample is scanned by the sharp end, a distance changing unit causes a differential change in a distance between the sharp end and the sample. A second detecting unit detects a second detection amount relating to a change of the first detection amount. A control unit controls the distance between the sharp end and the sample in accordance with the second detection amount, so that an average value of the distance between the sharp end and the sample is brought close to a definite value.

40 Claims, 15 Drawing Sheets

OTHER PUBLICATIONS

M. Tabib–Azar et al., "0.4 µm Spatial Resolution with 1 GHz (λ=30 cm) Evanescent Microwave Probe", Review of Scientific Instruments, vol. 70, No. 3, pp. 1725–1729, Mar. 1999.

M. Tabib–Azar et al., "Nondestructive Superresolution Imaging of Defects and Nonuniformities in Metal, Semiconductors, Dielectrics, Composites, and Plants Using Evanescent Microwaves", Review of Scientific Instruments, vol. 70, No. 6, pp. 2783–2792, Jun. 1999.

M. Tabib–Azar et al., "Novel Hydrogen Sensors Using Evanescent Microwave Probes", Review of Scientific Instruments, vol. 70, No. 9, pp. 3707–3713, Sep. 1999.

M. Tabib–Azar et al., "Novel Physical Sensors Using Evanescent Microwave Probes", Review of Scientific Instruments, vol. 70, No. 8, pp. 3381–3386, Aug. 1999.

M. Tabib–Azar et al., "Transcient Thermography Using Evanescent Microwave Microscope", Review of Scientific Instruments, vol. 70, No. 8, pp. 3387–3390, Aug. 1999.

M. Tabib–Azar et al., "Real–time Imaging of Semiconductor Space–charge Regions Using High–Spatial Resolution Evanescent Microwave Microscope", Review of Scientific Instruments, vol. 71, No. 3, pp. 1460–1465, Mar. 2000.

* cited by examiner

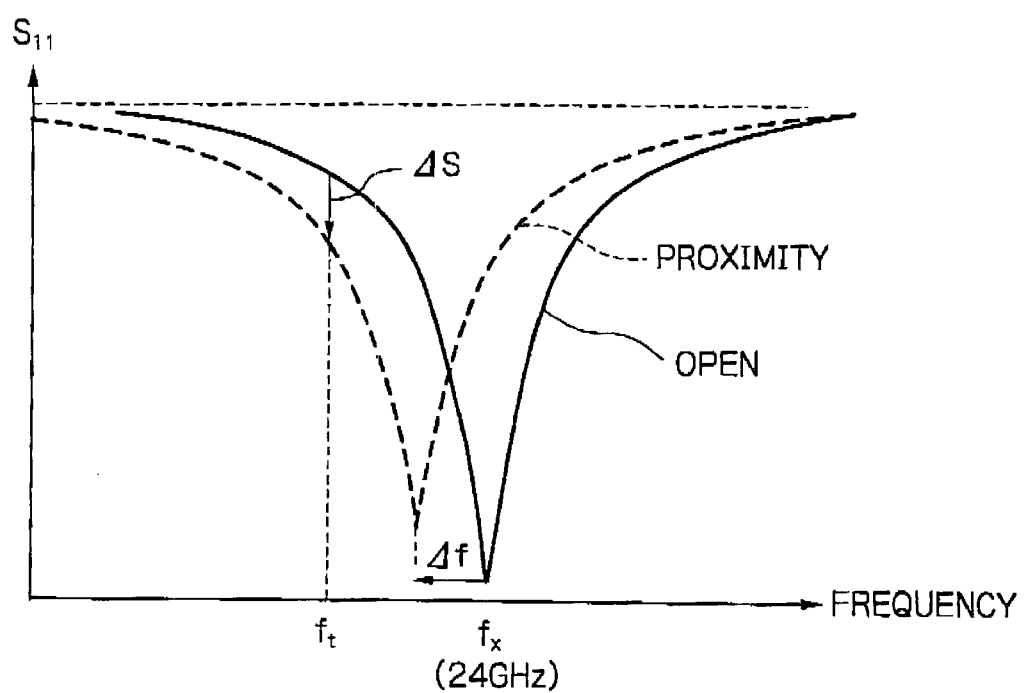

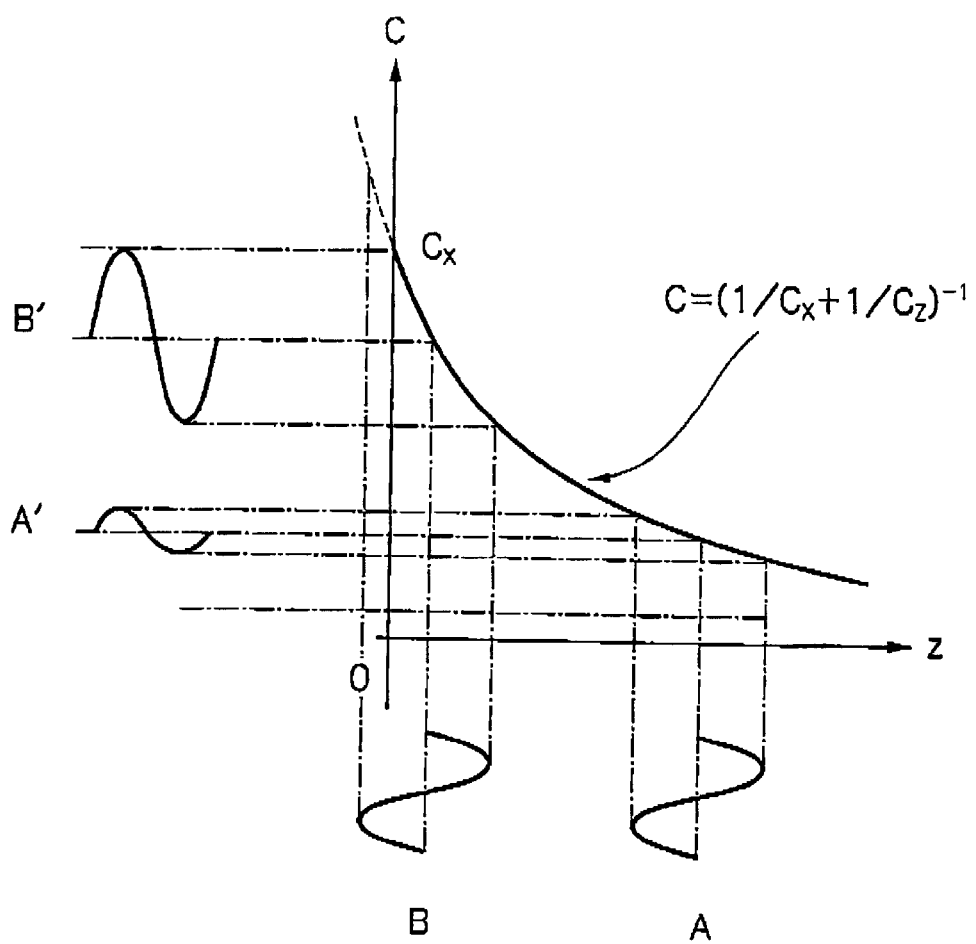

SCANNING MICROWAVE MICROSCOPE CAPABLE OF REALIZING HIGH RESOLUTION AND MICROWAVE RESONATOR

BACKGROUND OF THE INVENTION

1. Field of the Invention

The present invention relates to a scanning microwave microscope and a microwave resonator used in a two-dimensional image processing system for electrical properties of conductive material, insulating material or thin film material of a semiconductor device or the like on the order of nanometers with a high resolution.

2. Description of the Related Art

A first prior art scanning microwave microscope is constructed by a microwave resonator including a probe having a sharp end, so that the sharp end is in proximity to a sample while the sample is scanned by the sharp end, thus obtaining a two-dimensional image of an amount regarding an impedance of the sample. In this case, a $\lambda/4$ coaxial resonator having a sharp center conductor is used, and an amount relating to a resonant state is an amount relating to the difference in phase between a microwave detected by an antenna within the resonator and an excited microwave (see; C. Gao et al., "High Spatial Resolution Quantitative Microwave Impedance Microscope by a Scanning Tip Microwave Near-field Microscope", Appl. Phys. Lett. 71(13), pp.1872–1874, September 1997; and C. Sao et al., "Quantitative Microwave Near-field Microscopy of Dielectric Properties", Review of Scientific Instruments, Vol. 69, No. 11, pp. 3846–3851, November 1998).

A second prior art scanning microwave microscope is constructed by a coaxial multi-stage resonator including a probe having a sharp end, so that the sharp end is in proximity to a sample while the sample is scanned by the sharp end, thus obtaining a two-dimensional image of an amount regarding a resonant frequency or a Q-value of the sample. In this case, a reflected power is taken out of the resonator via a directional coupler, and the above-mentioned amount is obtained by detecting the reflected microwave power (see: C. P. Vlahacos et al., "Near-field Scanning Microwave Microscope with 100 $\mu$n Resolution", Appl. Phys. Lett. 69(21), pp. 3272–3274, November 1996; C. P. Vlahacos et al., "Quantitative Topographic Imaging Using a Near-field Scanning Microwave Microscope", Applied phys. Lett. 72(14), pp. 1778–1780, April 1998; and D. E. Steinharier et al., "Imaging of Microwave Permittivity, Tunability, and Damage Recovery in (Ba, Sr) TiO$_3$ Thin Films", Applied Phys. Lett. 75(20), November 1999).

A third prior art scanning microwave microscope is constructed by a strip-line type $\lambda/4$ resonator having a tapered line or a probe, so that the sharp end thereof is in proximity to a sample while the sample is scanned by the sharp end. A detected amount is a reflected power or a reflection coefficient $S_1$: from the resonator at a microwave frequency close to the resonant frequency (see: M. Tabib-Azar et al., "0.4 $\mu$m Spatial Resolution with 1 GHz ($\lambda$=30 cm) Evanescent Microwave Probe", Review of Scientific Instruments, Vol. 70, No. 3, pp. 1725–1729, March 1999; M. Tabib-Azar et al., "Nondestructive Superresolution Imaging of Defects and Nonuniformities in Metals, Semiconductors, Dielectrics, Composites, and Plants Using Evanescent Microwaves", Review of Scientific Instruments, Vol. 70, No. 6, pp. 2783–2791, June 1999; M. Tabib-Azar et al., "Novel Hydrogen Sensors Using Evanescent Microwaves Probe", Review of Scientific Instruments, Vol. 70, No. 9, pp. 3707–3713, September 1999; M. Tabib-Azar et al., "Novel Physical Sensors Using Evanescent Microwaves Probe", Review of Scientific Instruments, Vol. 70, No. 8, pp. 3381–3385, August 1999; M. Tabib-Azar et al., "Transient Thermography Using Evanescent Microwaves Microscope", Review of Scientific Instruments, Vol. 70, No. 8, pp. 3387–3390, August 1999; and M. Tabib-Azar et al., "Real-time Imaging of Semiconductor Space-charge Regions Using High-Spatial Resolution Evanescent Microwaves Microscope", Review of Scientific Instruments, Vol. 71, No. 3, pp. 1460–1465, March 2000.

Scanning capacitance microscopes are different from scanning microwave microscopes for convenience; however, they are essentially similar. That is, a scanning capacitance microscope is constructed by a strip-line resonator and a capacitance sensor having an excitation line and a receiver line coupled to the resonator. A conductive probe used in an atomic force microscope is connected to a resonator line. Then, two-dimensional data relating to the power at a frequency close to the resonant frequency is displayed while a sample is scanned. A commercially-available conductive probe along with a cantilever is manufactured by microfabrication method which performs a metal coating process upon monocrystalline silicon.

In the above-described prior art scanning microwave microscopes, since the end of a center conductor of the resonator is sharpened and is used as a probe, the structure of the resonator and its center conductor can be simply and precisely formed, and also, can be simplified for high frequencies. However, since the distance between the sharp end and the sample is not controlled, problems may occur due to the large dependency of signals generated from the resonator upon the distance between the sharp end and the sample when the sharp end is in proximity to the sample. Also, since the end of the center conductor used as an end of the probe, the resolution is limited by the radius of the center conductor. Further, when the sharp end is abraded, the entire resonator has to be replaced with another resonator.

On the other band, in the above-described scanning capacitance microscope, the cantilever is used for detecting the location of the sharp end in the same way as in the atomic force microscope, so that the distance between the sharp end and the sample can be detected at a high precision of about 1 nm. However, since a structure of the cantilever, the sharp end and the probe, a holder for holding the probe is complex, and the probe made of composite material of silicon and metal adapted to high frequencies is complex. Therefore, a complex electric field is generated within the resonator to cause complex reflected microwaves therein, so that the amount relating to the resonant state is not always sensitive to interference between the sharp end and the sample. As a result, in an extremely high frequency region such as a milliwave region, the microwave wavelength is close to a size of the structure, so that it is impossible to determine an observed resonant mode. Additionally, a change of the resonant state depending upon the specification of the holder for mounting the probe on the resonator may make it difficult to use the scanning capacitance microscope.

Thus, in the above-described prior art microscopes, the simplicity of the structure of the resonator including the probe and the control of the distance between the sharp end of the probe and the sample are insufficient. That is, in the prior art scanning microwave microscopes including a microwave resonator having a sharp end and a detector for detecting an amount relating to the resonant state of the, resonator so as to display this amount while the sample is scanned by the sharp ends when the distance between the sharp end and the sample is controlled, it is difficult to steadily maintain this distance at a definite small value.

SUMMARY OF THE INVENTION

It is an object of the present invention to provide a scanning microwave microscope capable of controlling an average distance between a sharp end of a microwave resonator and a sample at a definite value, thereby obtaining a high resolution.

Another object is to provide a microwave resonator used in the above-mentioned scanning microwave microscope.

According to the present invention, in a scanning microscope including a microwave resonator, an exciting unit for exciting the microwave resonator, a first detecting unit for detecting a first detection amount relating to a resonant state of the microwave resonator, a sharp end coupled to a center conductor of the microwave resonator, and a display unit for displaying the first detection amount while a sample is scanned by the sharp end, a distance changing unit causes a differential change in a distance between the sharp end and the sample. A second detecting unit detects a second detection amount relating to a change of the first detection amount. A control unit controls the distance between the sharp end and the sample in accordance with the second detection amount, so that an average value of the distance between the sharp end and the sample is brought close to a definite value.

Also, a microwave resonator includes a line section and a replaceable probe provided in the line section. The probe is constructed by a sharp conductive end.

DESCRIPTION OF THE DRAWINGS

The present invention will be more clearly understood from the description set forth below, with reference to the accompanying drawings, wherein:

FIG. 3 is a graph showing the reflection coefficient characteristics of the resonant system of FIG. 1;

FIG. 4 is a graph showing the total capacitance characteristics of the resonant system of FIG. 1;

DESCRIPTION OF THE PREFERRED EMBODIMENTS

Figure 1:
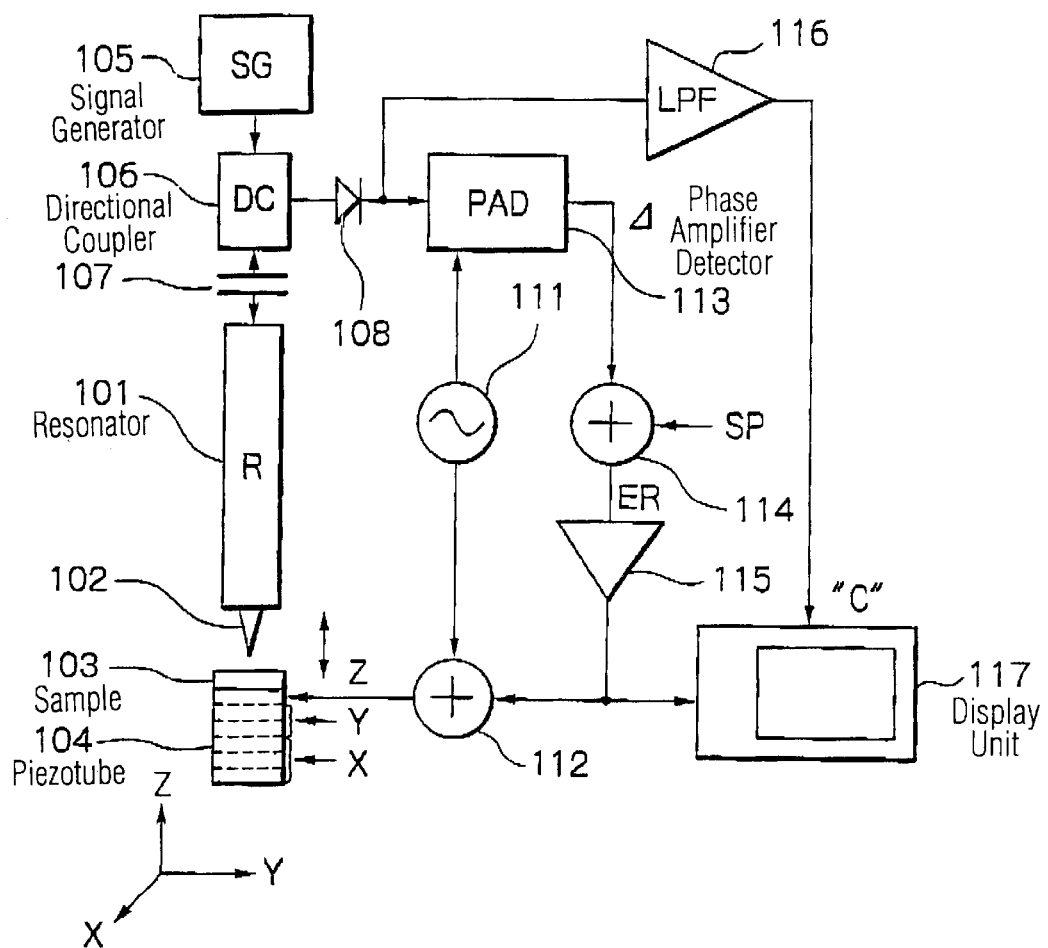
FIG. 1 is a block circuit diagram illustrating a first embodiment of the scanning microwave microscope according to the present invention.

In FIG. 1, which illustrates a first embodiment of the scanning microwave microscope according to the present invention, a multi-stage resonator 101 is constructed by a coaxial cable and has a sharp end 102 coupled to a center conductor thereof.

A sample 103 is mounted on a cylindrical piezotube 104 which is a three-dimensional piezoelectric element formed by a cylinder including five electrodes on its external surface and one electrode on its internal surface. In this case, an uppermost one of the electrodes on bite external surface of the piezotube 104 is used for controlling the Z-location of the sample 103, while the other four electrodes on the external surface of the piezotube 104 are used for controlling the X- and Y- locations of the sample 103. Also, a definite voltage is applied to the electrode on the internal surface of the piezotube 104.

The Z-location of the sample 103 is changed by a voltage applied to the uppermost electrode on the external surface of the piezotube 104, so that the average distance between the sharp end 102 of the resonator 101 and the sample 103 and a differential change thereof are controlled.

A signal generator 105 for generating an input microwave signal having a frequency of about 24 GHz is connected by a directional coupler 106 and a weak coupler 107 to the resonator 101, and thus, one resonant system is realized by the resonator 101, the sharp end 102 thereof and the sample 103 in proximity thereto. When the input microwave signal from the signal generator 105 is supplied via the directional coupler 106 and the weak coupler 107 to the resonant system, a microwave signal reflected by the resonant system is split from the input microwave signal at the directional coupler 106, and then, is supplied to a diode detector 108, so that the reflected microwave signal can be detected by the diode detector 108.

On the other hand, an oscillator 111 generates a signal and transmits it via an adder 112 to the piezotube 104, so that the distance between the sharp end 102 of the resonator 101 and the sample 103 is slightly modulated by the frequency of the oscillator 111. A change in the resonant system caused by the frequency of the oscillator 111 is detected by the diode detector 108 and then, is supplied to a phase amplitude detector 113 which detects the difference Δ in amplitude of the output signal of the diode detector depending upon an "approaching" phase and a "departing" phase thereof using the frequency of the oscillator 111 as a reference. The "approaching" phase and the "departing" phase will be explained later. An adder 114 compares the detected amplitude difference Δ with a preset set point value SP, to generate an error signal ER. This error signal ER is amplified by a feedback amplifier 115 and is added by the adder 112 to the output signal of the oscillator 111, so that the adder 112 generates the voltage for changing the Z-location of the sample 103. Therefore, a feedback control operation by using the error signal ER of the adder 114 is performed upon the Z-location of the sample 103, so that the detected amplitude difference Δ is brought close to the set point value SP. As a result, the average distance between the sharp end 102 of the resonator 101 and the sample 103 is brought close to a definite value such as about zero determined by the set point value SP.

A low-pass filter 116 is connected to the diode detector 108, to generate a signal "C" regarding the capacitance between the sharp end 102 of the resonator 101 and the sample 103. The capacitance signal "C" is displayed on a display unit 117 of a personal computer which controls the entire scanning microwave microscope. For example, the personal computer controls the X- and Y-locations of the sample 103 by applying voltages to the piezotube 104. Therefore, the capacitance signal "C" in relation to the X- and Y-locations of the sample 103 can be displayed on the display unit 117. Also, the output signal of the feedback amplifier 115 for controlling the distance between the sharp end 102 of the resonator 101 and the sample 103 also represents the average displacement of the sample 103 when the sharp end 102 of the resonator 101 is in proximity to the sample 103. Therefore, a topographical image of the sample 103 using the output signal of the feedback amplifier 115 in relation to the X- and Y-locations of the sample 103 can be displayed on the display unit 117.

Figure 2A:
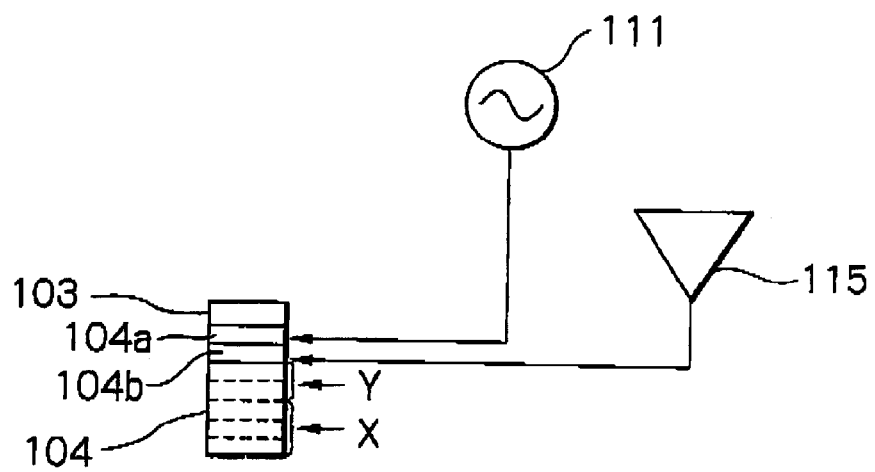
FIGS. 2A and 2B are circuit diagrams illustrating modifications of FIG. 1.
Figure 2B:
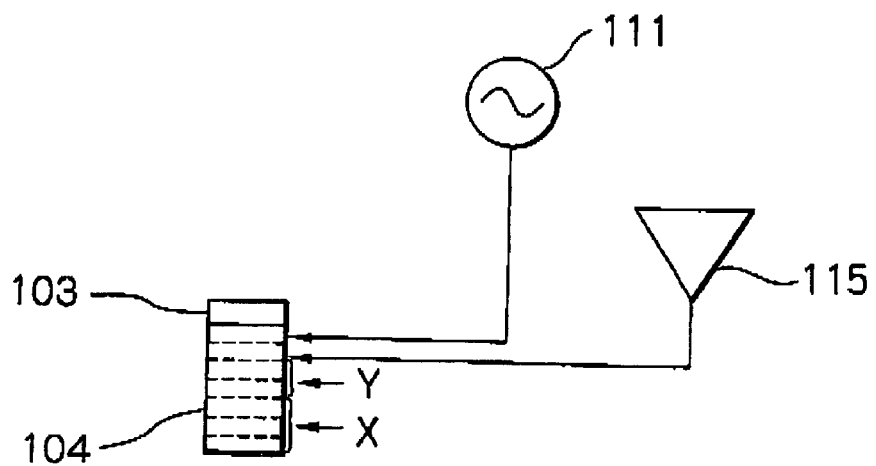

As illustrated in FIGS. 2A and 2B, the adder 112 of FIG. 1 can be omitted.

In FIG. 2A, a piezoelectric element 104a driven by the oscillator 111 and a piezoelectric element 104b driven by the feedback amplifier 115 are coupled in series on the piezotube 104 which, in this case, includes only four electrodes on its external surface. Also, a sample pedestal (not shown) made of crystal oscillator can be inserted between the sample 103 and the piezotube 104. Note that the frequency of the piezotube 104 used in atomic force microscopes is about 10 kHz; however, when the crystal oscillator sample pedestal is provided, the frequency of the piezotube 104 can be higher than 100 kHz if there is no problem in the mounting of the crystal oscillator sample pedestal.

On the other hand, in FIG. 2B, the piezotube 104 includes six electrodes on its external surface. Therefore, the uppermost one of the six electrodes receives the output signal of the oscillator 111, and the second uppermost one of the six electrodes receives the output signal of the feedback amplifier 115.

The principle of the operation of the scanning microwave microscope of FIG. 1 is explained next with reference to FIGS. 3 and 4. Note that FIG. 3 shows the reflection coefficient characteristics of the resonant system of FIG. 1, and FIG. 4 shows the total capacitance characteristics of the resonant system of FIG. 1.

When the sharp end 102 of the resonator 101 is opened, i.e., when the sharp end 102 of the resonator 101 is sufficiently distant from the sample 103, the resonant system of FIG. 1 is resonated at a specific resonant frequency such as 24 GHz as indicated by a solid line in FIG. 3. For example, in the scanning microwave microscope of FIG. 1, the above-mentioned specific frequency has an interval of 200 MHz. That is, the reflection coefficient $S_{11}$ is minimum at the specific resonant frequency $f_x$ such as 24 GHz.

When the sharp end 102 of the resonator 101 is close to the sample 103, the resonant curve is shifted toward the low frequency side and also the resonant curve is broadened, so that the Q-value is decreased, as indicated by a dotted line in FIG. 3.

If a change in the reflection coefficient $S_{11}$ due to the proximity of the sharp end 102 of the resonator 101 to the sample 103 is considered as a perturbation, since the width of the reflection curve can be negligible, i.e., the change of the Q-value can be negligible, the shift amount Δf of the resonant frequency $f_x$ is in proportion to an increased capacitance between the sharp end 102 of the resonator 101 and the sample 103. At this time, a reduction ΔS is observed in the reflection coefficient $S_{11}$ at a frequency $f_t$ lower than the resonant frequency $f_x$. If this reflection coefficient reduction ΔS is considered as a perturbation, the reflection coefficient reduction ΔS is also in proportion to the increased capacitance between the sharp end 102 of the resonator 101 and the sample 103. In the scanning microwave microscope of FIG. 1, the frequency $f_t$ corresponds to the frequency of the oscillator 111.

The amplitude difference between the "approaching" phase and the "departing" phase is explained next in detail.

The resonator 101 is responsive to a total capacitance C given by $$C = C_x C_z / (C_x + C_z)$$

where $C_x$ is a capacitance of the sample 103; and $C_z$ is a capacitance of a gap depending upon the distance z between the sharp end 102 of the resonator 101 and the sample 103. Also, if $A^{1/2}$ is much larger than z where A is an area A of the sharp end 102 of the resonator 101 opposing the sample 103, the capacitance $C_z$ is approximated as $\epsilon_0 A/z$ where $\epsilon_0$ is a permittivity of free space. Further, the larger the total capacitance C, the smaller the resonant frequency $f_x$ of the resonant system, including the sharp end 102 of the resonator 101 and the sample 103. If the total capacitance C is considered as a perturbation, the shift amount Δf of the resonant frequency $f_x$ is in proportion to the total capacitance C.

On the other hand, at a frequency such as $f_t$ in proximity to and lower than the resonant frequency $f_x$, the larger the total capacitance C, the smaller the reflection power from the resonant system which is detected by the diode detector 108.

As shown in FIG. 4, when the distance z between the sharp end 102 of the resonator 101 and the sample 103 is small so that the sharp end 102 of the resonator 101 is close to the sample 103, the capacitance $C_z$ is large. On the other hand, when the distance z is large, the total capacitance C is small. As a result, when the distance z is subject to a sinusoidal modulation, the total capacitance C is slightly sinusodally-modulated. For example, at an "approaching" phase where the sharp end 102 of the resonator 101 is approaching the sample 103, the total capacitance C is increased, so that the output signal of the diode detector 108 is decreased. On the other hand, at a "departing" phase where the sharp end 102 of the resonator 101 is departing from the sample 103, the total capacitance C is decreased, so that the output signal of the diode detector 108 is increased.

First, consider a sinusoidal modulation of the distance z as indicated by "A" in FIG. 4 where the sharp end 102 of the resonator 101 is not in contact with the sample 103. Here, "A" shows one sinusoidal-modulated wavelength including an "approaching" phase $P_1$ where the sharp end 102 of the resonator 101 is approaching the sample 103 and a "departing" phase $P_2$ where the sharp end 102 of the resonator 101 is departing from the sample 103. In this case, the average amplitude of the modulated total capacitance C is larger at the "approaching" phase $P_1$ than at the "departing" phase $P_2$. Therefore, the average amplitude of the output signal of the diode detector 108 is also larger than at the "approaching" phase $P_1$ than at the "departing" phase $P_2$, so that the amplitude difference $\Delta$ in the output signal of the diode detector 108 between the "approaching" phase $P_1$ and the "departing" phase $P_2$ is positive. Note that, since the sinusoidal modulation of the distance z is very small, the amplitude difference $\Delta$ is linearly-approximated to derive a positive value close to zero.

Next, consider a sinusoidal modulation of the distance z as indicated by "B" in FIG. 4 where the sharp end 102 of the resonator 101 is in contact with the sample 103. That is, the sharp end 102 of the resonator 101 penetrates the sample 103 a little. Here, "B" shows one sinusoidal-modulated wavelength including an "approaching" phase $P_1'$ where the sharp end 102 of the resonator 101 is approaching the sample 103 and a "departing" phase $P_2'$ where the sharp end 102 of the resonator 101 is departing from the sample 103. In this case, when z is negative, C is equal to $C_x$. Therefore, the average amplitude of the modulated total capacitance C is smaller at the "approaching" phase $P_1'$ than at the "departing" phase $P_2'$. As a result, the average amplitude of the output signal of the diode detector 108 is also smaller at the "approaching" phase $P_1'$ than at the "departing" phase $P_2'$, so that the amplitude difference $\Delta$ in the output signal of the diode detector 108 between the "approaching" phase $P_1'$ and the "departing" phase $P_2'$ is negative or zero. Thus, while the sharp end 102 of the resonator 101 is moving toward the sample 103, the sign of the above-mentioned difference $\Delta$ may change at a time when the sharp end 102 of the resonator 101 touches the sample 103. Therefore, the error signal ER between the difference $\Delta$ and the set point value ST which is close to zero is amplified and is fed back to the piezotube 104, so that the average distance between the sharp end 102 of the resonator 101 and the sample 103 is in proximity to zero.

Examples of the phase amplitude detector 113 of FIG. 1 are explained next with reference to FIGS. 5, 6, 7 and 8.

Figure 5:
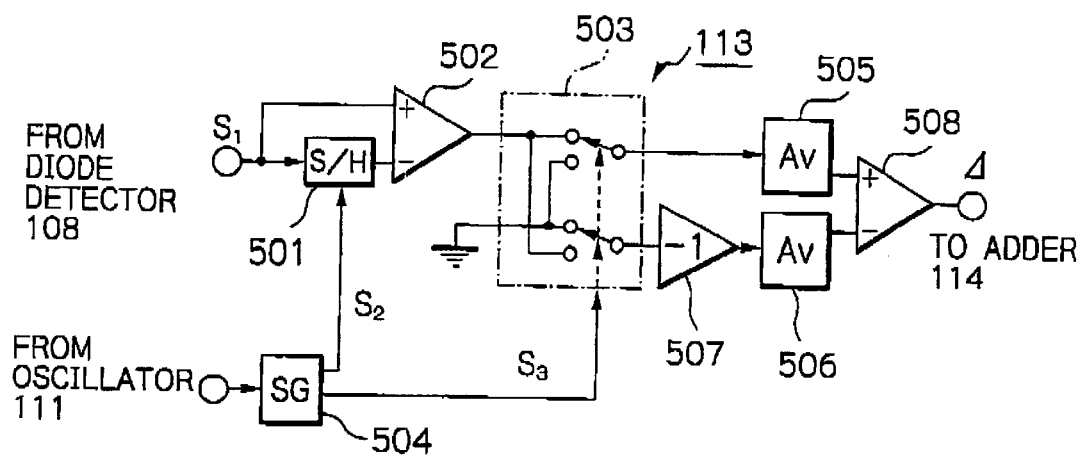
FIG. 5 is a detailed circuit diagram of a first example of the phase amplitude detector of FIG. 1.
Figure 6:
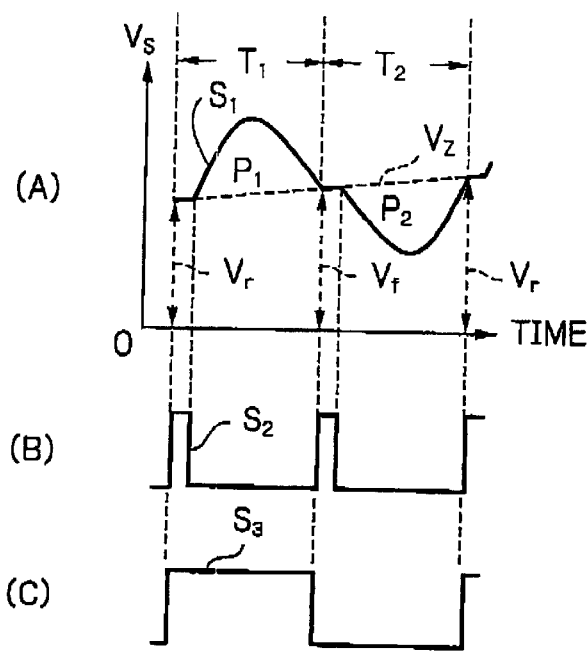
FIG. 6 is a timing diagram for explaining the operation of the phase amplitude detector of FIG. 5.

In FIG. 5, which illustrates a first example of the phase amplitude detector 113 of FIG. 1, reference numeral 501 designates a sample/hold circuit for sampling tile output signal $S_1$ of the diode detector 108 as shown in FIG. 6(A) in response to the output signal $S_2$ of a signal generator 504 as shown in FIG. 6(B). The output signal $S_1$ of the diode detector 108 includes a DC offset component $V_z$ changed by the average distance Z superposed by a sinusoidal change by a sinusoidal modulation of the distance z with no delay. As a result, the sample/hold circuit 501 samples the output signal $S_1$ as $V_r$ and $V_f$ at intervals of 180° of the sinusoidal modulation signal. A differential amplifier 502 amplifies a difference between the output signal $S_1$ of the diode detector 108 and the sampled voltage $V_r$ and $V_f$ of the sample/hold circuit 501.

The sign of the output signal of the differential amplifier 502 would change at a timing from an approaching phase such as $P_1$ to a departing phase such as $P_2$ or vice versa. For responding to the change of sign, a switching circuit 503 is connected to the differential amplifier 502. This switching circuit 503 is operated by the output signal $S_3$ of the signal generator 504 as shown in FIG. 6(C). Note that the signal generator 504 receives the output signal of the oscillator 111. As a result, an average value of the output signal of the differential amplifier 502 at the "approaching" phase $P_1$ is calculated by an averaging circuit 505. On the other hand, an average value of the output signal of the differential amplifier 502 at the "departing" phase $P_2$ is calculated by an averaging circuit 506 through an inverter 507. Finally, a differential amplifier 508 calculates a difference between the output signals of the averaging circuits 505 and 506 to generate the above-mentioned amplitude difference $\Delta$. Note that each of the averaging circuits 505 and 506 calculates an average value of its input over a time period longer than $T_1+T_2$ where $T_1$ and $T_2$ are time periods of one "approaching" phase $P_1$ and one "departing" phase $P_2$, respectively.

Figure 7:
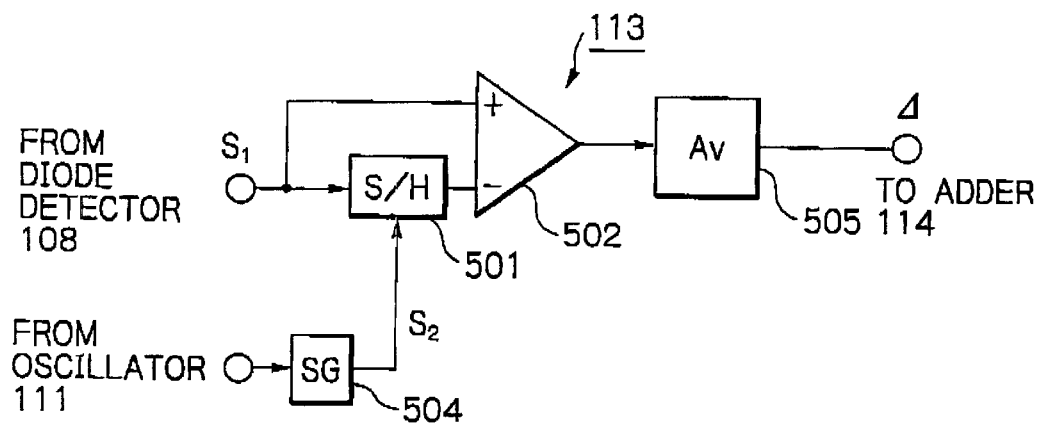
FIG. 7 is a detailed circuit diagram of a second example of the phase amplitude detector of FIG. 1.
Figure 8:
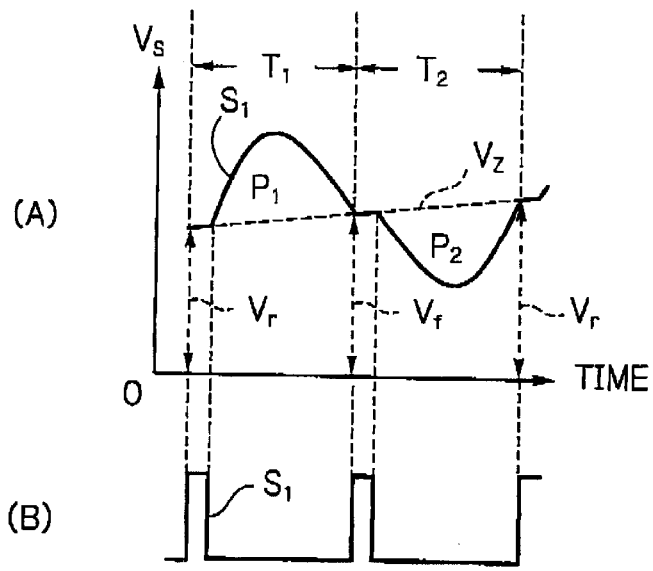
FIG. 8 is a timing diagram for explaining the operation of the phase amplitude detector of FIG. 7.

In FIG. 7, which illustrates a second example of the phase amplitude detector 113 of FIG. 1, the switching circuit 503, the averaging circuit 506, the inverter 507 and the differential amplifier 508 of FIG. 5 are omitted. Also, the signal generator 504 generates only the signal $S_2$, and the phase amplitude detector 113 of FIG. 7 is operated by the signals $S_1$ and $S_2$ as shown in FIG. 8. In this case, the averaging circuit 505 calculates an average value over a time period longer than $T_1+T_2$.

Figure 9:
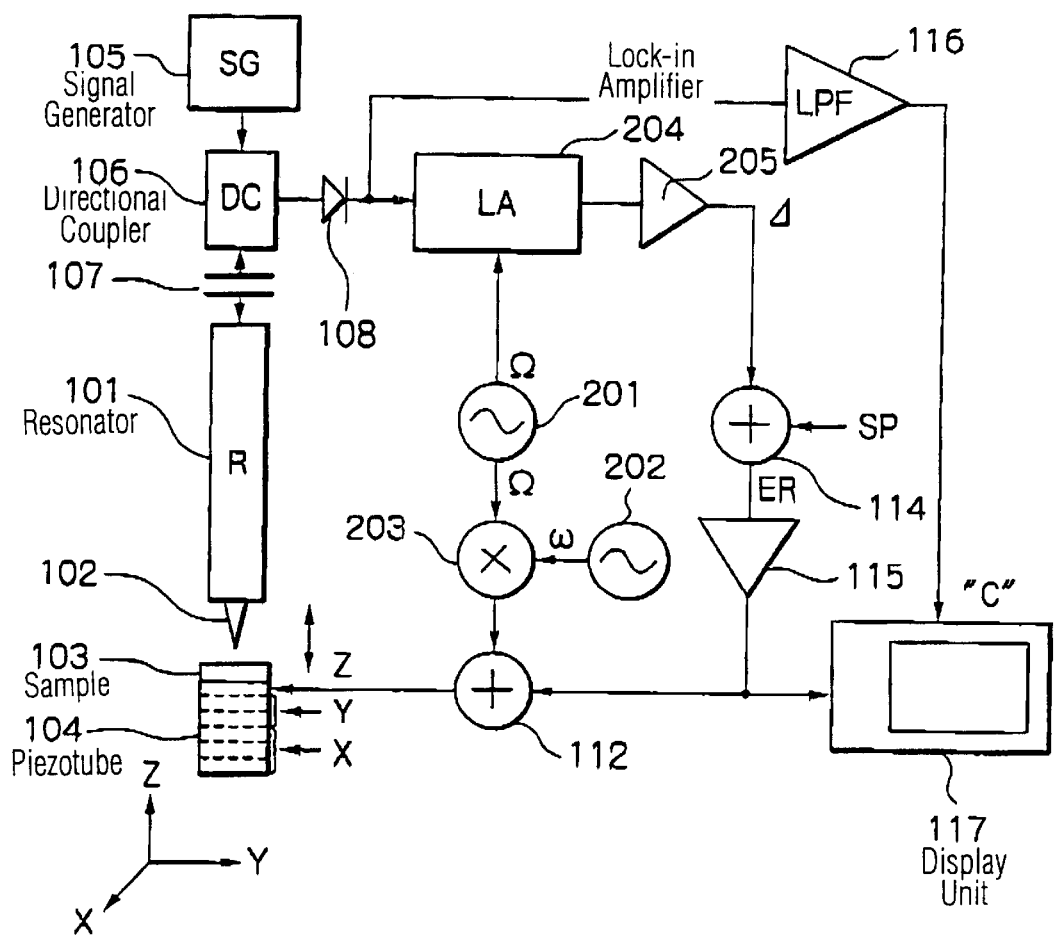
FIG. 9 is a block circuit diagram illustrating a second embodiment of the scanning microwave microscope according to the present invention.

In FIG. 9, which illustrates a second embodiment of the scanning microwave microscope according to the present invention, an oscillator 201 having an angular frequency of $\Omega$, an oscillator 202 having an angular frequency of $\omega(\omega<\Omega)$ and a multiplier 203 for calculating a product of output signals of the oscillators 201 and 202 are provided instead of the oscillator 111 of FIG. 1, and a lock-in amplifier 204 and a low-pass filter 205 are provided instead of the phase amplitude detector 113 of FIG. 1.

Figure 10:
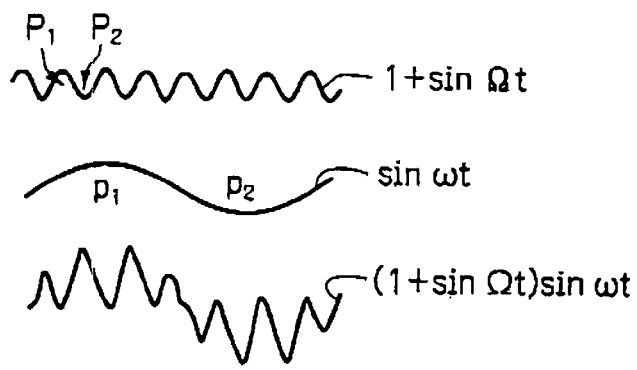
FIG. 10 is a timing diagram for explaining the operation of the scanning microwave microscope of FIG. 9.

Here, a ratio of the angular frequency $\Omega$ to the angular frequency $\omega$ is an even number, and there is no difference in phase between the output signals of the oscillators 201 and 202. Therefore, as shown in FIG. 10, the oscillator 201 generates a signal of $(1+\sin \Omega t)$ and the oscillator 202 generates a signal of $\sin \omega t$, and accordingly, the multiplier 203 generates a signal of $(1+\sin \Omega t)\cdot\sin \omega t$.

As a result, the distance z between the sharp end 102 of the resonation 101 and the sample 103 is modulated by the signal of $(1+\sin \Omega t)\cdot\sin \omega t$, so that a change in the state of the resonant system is a change of microwave amplitude which leads to the change of the output signal of the diode detector 108.

The change of the output signal of the diode detector 108 is detected by the lock-in amplifier 204 using the angular frequency $\Omega$ of the oscillator 201 as a reference. In this case, a phase $P_1$ of 0° to 180° of $\alpha t$ corresponds to an "approaching" phase, and a phase $P_2$ of 180° to 360° of $\Omega t$ corresponds to a "departing" phase. Additionally, a phase $p_1$ of 0° to 180° of $\omega t$ corresponds to an "approaching" phase, and a phase $p_2$ of 180° to 360° of $\omega t$ corresponds to a "departing" phase. Therefore, the output signal of the lock-in amplifier 204 corresponds to a response amplitude modulated by the angular frequency $\Omega$ having a sign depending on the phase of the angular frequency $\omega$.

Since the above-mentioned response amplitude having the sign depending on the phase of the angular frequency $\omega$ is averaged by the low-pass filter 205, the output signal of the low-pass filter 205 is in proportion to a difference $\Delta$ in amplitude between the "approaching" phase $P_1$ and the "departing" phase $P_2$ of $\Omega t$ associated with a sign depending upon the "approaching" phase $p_1$ or the "departing" phase $p_2$ of $\omega t$.

Thus, in the same way as in the first embodiment, while the sharp end 102 of the resonator 101 is moving toward the sample 103, the sign of the above-mentioned difference $\Delta$ would change at a time when the sharp end 102 of the resonator 101 touches the sample 103. Therefore, the error signal ER between the difference Δ and the set point value ST which is close to zero is amplified and is fed back to the piezotube 104, so that the average distance between the sharp end 102 of the resonator 101 and the sample 103 is in proximity to zero.

As explained above, at an "approaching" phase of Ωt and at an "approaching" phase of ωt, the sharp end 102 of the resonator 101 is in closest proximity to the sample 103, so that the capacitance $C_z$ is maximum, i.e., the total capacitance C is maximum. Thus, the resonant frequency $f_x$ is minimum. Therefore, the output signal of the diode detector 108 at a frequency $f_t$ in proximity to and lower than the resonant frequency $f_x$ is minimum. In summary, at an "approaching" phase $p_1$ of ωt, the output signal of the diode detector 108 is smaller at an "approaching" phase $P_1$ of sin Ωt than at other phases such as a "departing" phase $P_2$ of Ωt.

Since the output signal of the lock-in amplifier 204 is a difference in amplitude between the "approaching" phase $P_1$ and the "departing" phase $P_2$ of Ωt associated with a sign depending the phase of ωt, the output signal of the low-pass filter 205 is an average value of amplitude differences in response to the frequency Ω at different phases of ωt. Therefore, if a sign determined by the approaching phase $P_1$ of the frequency Ω is negative, the output signal of the low-pass filter 205 is negative. This state will continue until the sharp end 102 of the resonator 101 is in contact with the sample 103.

When the sharp end 102 of the resonator 101 touches the sample 103, the total capacitance C is definite, i.e., $C_x$ (see FIG. 4). At this time, it is assumed that the sharp end 102 of the resonator 101 can penetrate the sample 103 slightly. Then, the average value of amplitude differences in response to the frequency Ω is changed from a small negative value to a value close to zero or a small positive value.

Thus, if the set point value ST is a value close to zero, a negative feedback control by using the error signal ER of the adder 114 is carried out. That is, when the average value of amplitude differences is negative, the sharp end 102 of the resonator 101 is moved toward the sample 103. On the other hand, when the average value of amplitude differences is positive, the sharp end 102 of the resonator 101 is departed from the sample 103. As a result, the sharp end 102 of the resonator 101 is in proximity to the sample 103.

In FIG. 9, in the same way as in FIGS. 2A and 2B, the multiplier 203 and the error amplifier 115 can be connected directly to the piezotube 104.

Figure 11:
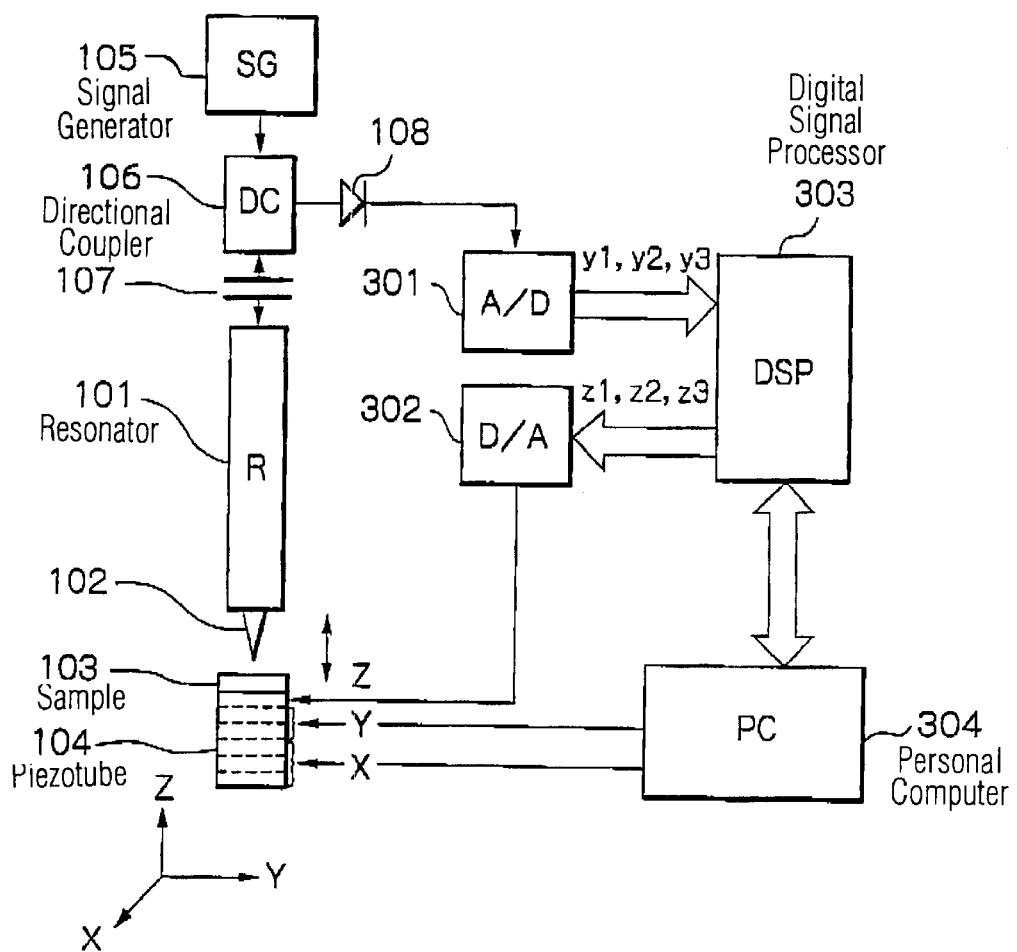
FIG. 11 is a block circuit diagram illustrating a third embodiment of the scanning microwave microscope according to the present invention.

In FIG. 11, which illustrates a third embodiment of the scanning microwave microscope according to the present invention, an analog/digital (A/D) converter 301, a digital/analog (D/A) converter 302, a digital signal processor (DSP) 303 and a personal computer 304 are provided instead of the oscillator 111, the adder 112, the phase amplitude detector 113, the adder 114, the error amplifier 115 and the low-pass filter 116 of FIG. 1. Note that the display unit 117 of FIG. 1 is incorporated into the personal computer 304. The scanning microwave microscope of FIG. 10 can be operated in the same way as in the scanning microwave microscope of FIG. 1. That is, the DSP 303 generates is sinusoidal data based upon a quarter of a sinusoidal wavelength and transmits it via the D/A converter 302 to the piezotube 104. Simultaneously, the A/D converter 301 performs an A/D conversion upon the output signal of the diode detector 108 and transmits digital data corresponding to the output signal of the diode detector 108 to the DSP 303. Then, a difference between each sampled digital data at a half period of the sinusoidal wavelength and sampled digital data and its corresponding reference value is calculated, and an average value of the above-mentioned differences is calculated over the half period of the sinusoidal wavelength.

Next, a difference in average value between one half period and the other half period of one sinusoidal wavelength is calculated. Then, the average value difference is subject to a D/A conversion using the D/A converter 302, so that the obtained analog data is applied to the piezotube 104, thus controlling the average distance between the sharp end 102 of the resonator 101 and the sample 103. Various programs of the DSP 303 are possible for the above-mentioned control using the average amplitude difference under a condition that the distance Z between the sharp end 102 of the resonator 101 and the sample 103 is modulated slightly. Also, the scanning microwave microscope of FIG. 11 can carry out the second embodiment as illustrated in FIG. 9 using two sinusoidal wavelengths.

Note that the scanning microwave microscope of FIG. 11 can remove an error caused by a droop inherent to the sample/hold circuit 501 of the phase amplitude detector 113 of FIGS. 5 and 7. That is, in the sample/hold circuit 501 of the phase amplitude detector 113 of FIGS. 5 and 7, as time goes by, a sampled voltage therein is brought close to zero, which would cause a droop error. Contrary to this, the A/D converter 301 is of a digital type, and accordingly, a sampled voltage in the A/D converter 301 will never change.

Other operations of the scanning microwave microscope of FIG. 11 are explained next with reference to FIGS. 12A and 12B.

Figure 12A:
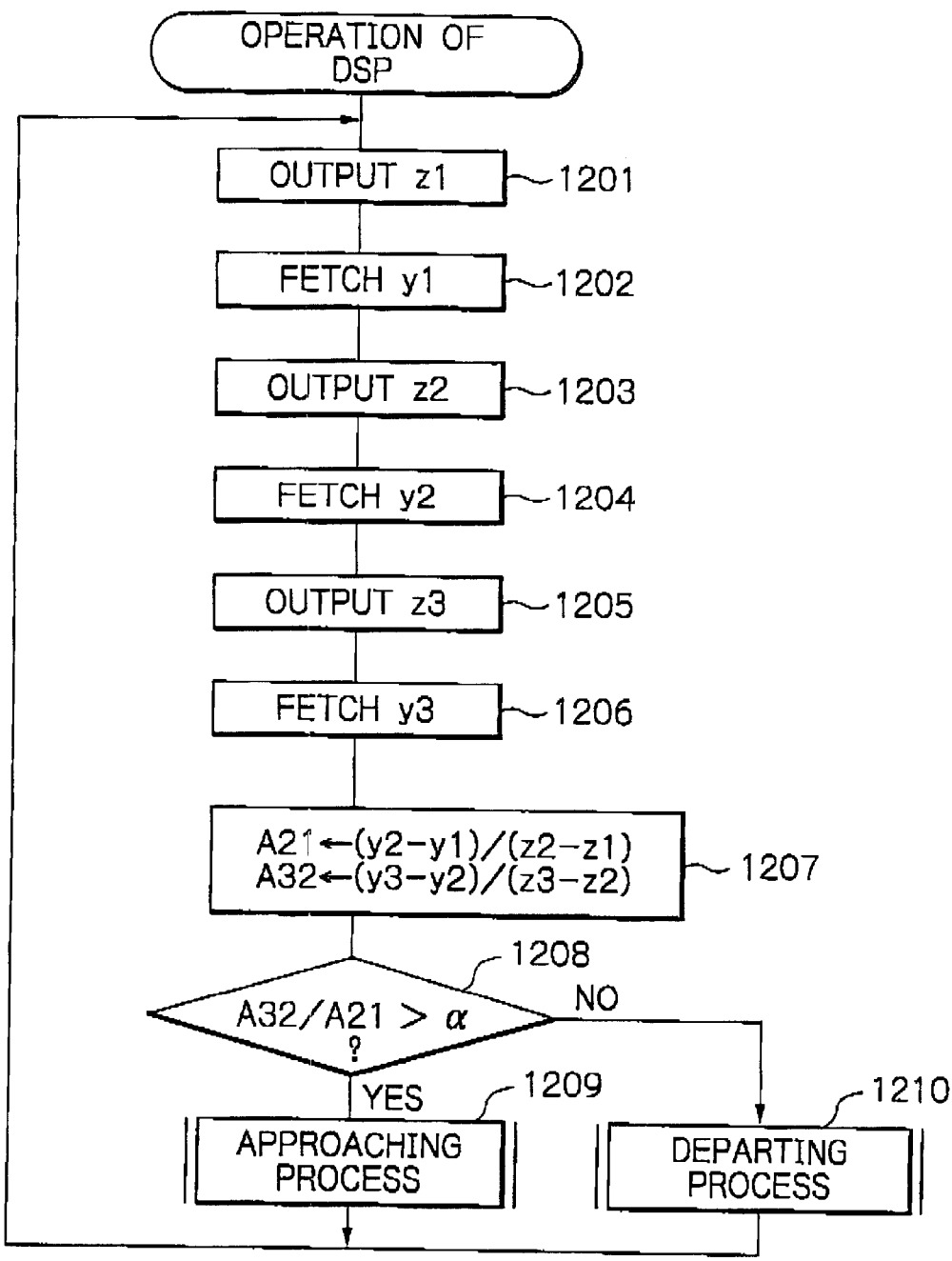
FIGS. 12A and 12B are flowcharts for explaining the operation of the scanning microwave microscope of FIG. 11.

FIG. 12A is an example of a routine of the DSP 303 of FIG. 11 for performing a stepwise displacement operation upon the distance z between the sharp end 102 of the resonator 101 and the sample 103.

First, at step 1201, the DSP 303 outputs a digital voltage corresponding to a distance z1 to the D/A converter 302. As a result, the distance z is brought close to z1. Then, at step 1202, the DSP 303 fetches the output signal of the diode detector 108 as a digital value y1 through the A/D converter 301.

Next, at step 1203, the DSP 303 outputs a digital voltage corresponding to a distance z2 to the D/A converter 302. As a result, the distance z is brought close to z2. Then, at step 1204, the DSP 303 fetches the output signal of the diode detector 108 as a digital value y2 through the A/D converter 301.

Next, at step 1205, the DSP 303 outputs a digital voltage corresponding to a distance z3 to the D/A converter 302. As a result, the distance z is brought close to z3. Then, at step 1206, the DSP 303 fetches the output signal of the diode detector 108 as a digital value y3 through the A/D converter 301.

Note that the values z1, z2 and z3 satisfy the following:

$$z1 < z2 < z3.$$

Next, at step 1207, a relative difference A21 is calculated by $$A21 \leftarrow (y2-y1)/(z2-z1)$$

Also, a relative difference A32 is calculated by $$A32 \leftarrow (y3-y2)/(z3-z2)$$

Next, at step 1208, a ratio of A32 and A21 is calculated, and then, it is determined whether or not A32/A31>α is satisfied. Here, α is a definite value close to 1. As a result, when A32/A31>α, the control proceeds to step 1209 which carries out an approaching process where the sharp end 102 of the resonator 101 approaches the sample 103 by increasing the distance z2, for example, while the difference z2–z1 or z3–z2 is maintained. On the other hand, when A32/A31≦α, the control proceeds to step 1210 which carries out a departing process where the sharp end 102 of the resonator 101 is departed from the sample 103 by decreasing the distance z2, for example, while the difference z2–z1 or z3–z2 is maintained.

Thus, the above-mentioned control is repeated to perform a negative feedback control upon the average distance z between the sharp end 102 of the resonator 101 and the sample 103, so that the ratio A32/A21 is brought close to α.

Figure 12B:
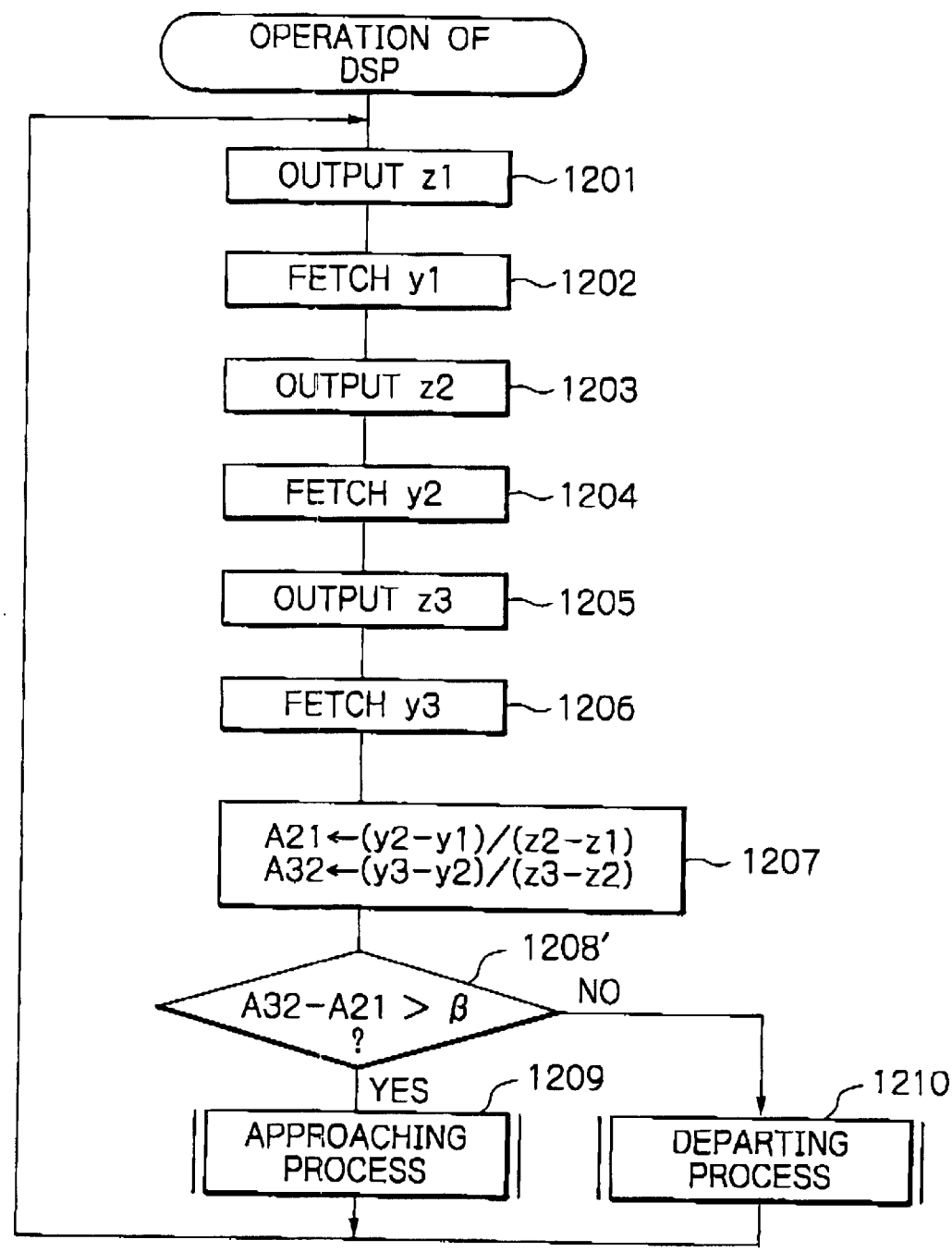

In FIG. 12B, which is a routine illustrating a modification of FIG. 12A, a step 1208' is provided instead of step 1208 of FIG. 12A.

That is, at step 1208', a difference between A32 and A21 is calculated, and then, it is determined whether or not A32–A31>β is satisfied. Here, β is a definite value close to 0. As a result, when A32–A31>β, the control proceeds to step 1209 which carries out an approaching process where the sharp end 102 of the resonator 101 approaches the sample 103 by increasing the distance z2, for example, while the difference z2–z1 or z3–z2 is maintained. On the other hand, when A32–A21≦β, the control proceeds to step 1210 which carries out a departing process where the sharp end 102 of the resonator 101 is departed from the sample 103 by decreasing the distance z2, for example, while the difference z2–z1 or to z3–z2 is maintained.

Thus, the above-mentioned control is repeated to perform a negative feedback control upon the average distance z between the sharp end 102 of the resonator 101 and the sample 103, so that the difference A32–A21 is brought close to β.

In FIGS. 12A and 12B, information regarding a resonant state to be displayed on the display unit of the personal computer 304 is the output signal of the diode detector 108 at z=z3.

Figure 13:
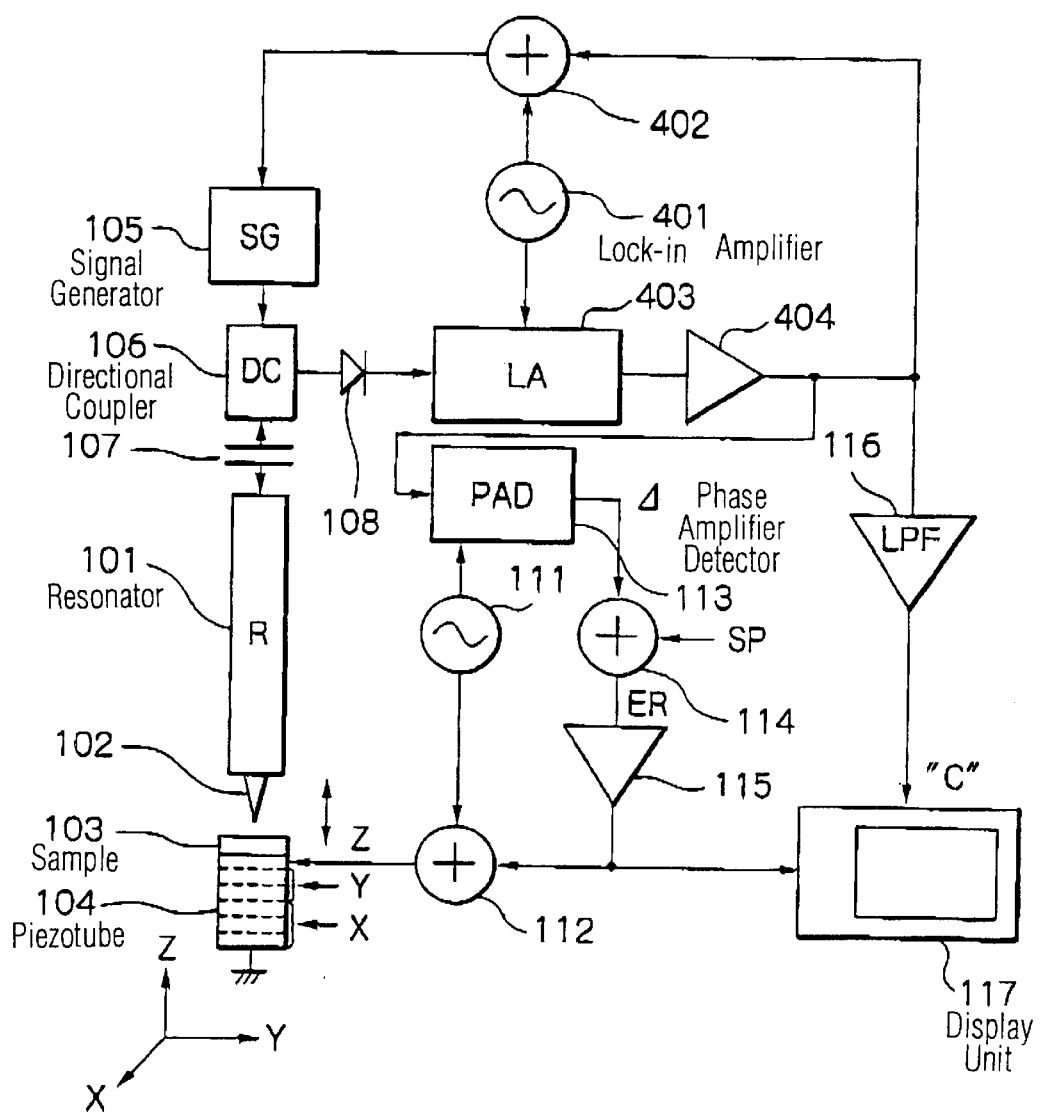
FIG. 13 is a block circuit diagram illustrating a fourth embodiment of the scanning microwave microscope according to the present invention.

In FIG. 13, which illustrates a fourth embodiment of the scanning microwave microscope according to the present invention, an oscillator 401, an adder 402, a lock-in amplifier 403 and an amplifier 404 are added to the scanning microwave microscope of FIG. 1, to detect a deviation of the resonant frequency of the resonant system from that in an open state. In this case, the signal generator 105 is a voltage controlled oscillator having a voltage control input.

In FIG. 13, a sinusoidal wave signal of the oscillator 401 having a frequency close to the resonant frequency of the resonant system in an open state is supplied via the adder 402 to the signal generator 105, so that the microwave frequency of the signal generator 105 is modulated at a frequency close to the resonant frequency. The modulated microwave frequency signal of the signal generator 105 is supplied to the diode detector 108, so that the output signal of the diode detector 108 is detected by the lock-in amplifier 403 using the frequency of tile oscillator, 401 as a reference. Then, the output signal of the lock-in amplifier 403 is amplified by the amplifier 404, and is, then, supplied to the adder 402. As a result, the adder 402 adds the output signal of the amplifier 404 to the output signal of the oscillator 401.

On the other hand, the output signal of the amplifier 404 is supplied to the phase amplitude detector 113 for controlling the distance z between the sharp end 102 of the resonator 101 and the sample 103. Thus, in the same way as in the first embodiment, a difference Δ in amplitude depending on the phases is detected by using a signal for modulating the distance z as a reference and is compared with the set point value ST. Then, a comparison result IS amplified by the amplifier 115 and is added by the adder 112 to the output signal of the oscillator 111, so that the average distance between the sharp end 102 of the resonator 101 and the sample 103 is brought close to zero.

The output signal of the amplifier 404 is supplied via the low-pass filter 116 to the display unit 117, thus displaying the output signal of the amplifier 404.

The operation of the scanning microwave microscope of FIG. 13 is explained simply below.

When the microwave frequency of the signal generator 105 is modulated at a frequency close to the resonant frequency, the sign of the output signal of the lock-in amplifier 403 changes at the resonant frequency. Therefore, a negative feedback control is carried out by using the sign of the output signal of the lock-in amplifier 403, to determine the sign of a voltage supplied to the voltage control input of the signal generator 105. As a result, the resonant frequency can be tracked.

Thus, when the voltage control input of the signal generator 105 is zero, the output signal of the amplifier 404 is a signal in proportion to the difference in resonant frequency between that in an open state and that in an interference state with the sample lot, which is used for controlling the average distance z between the sharp end 102 of the resonator 101 and the sample 101 as in the first embodiment of FIG 1.

Figure 14:
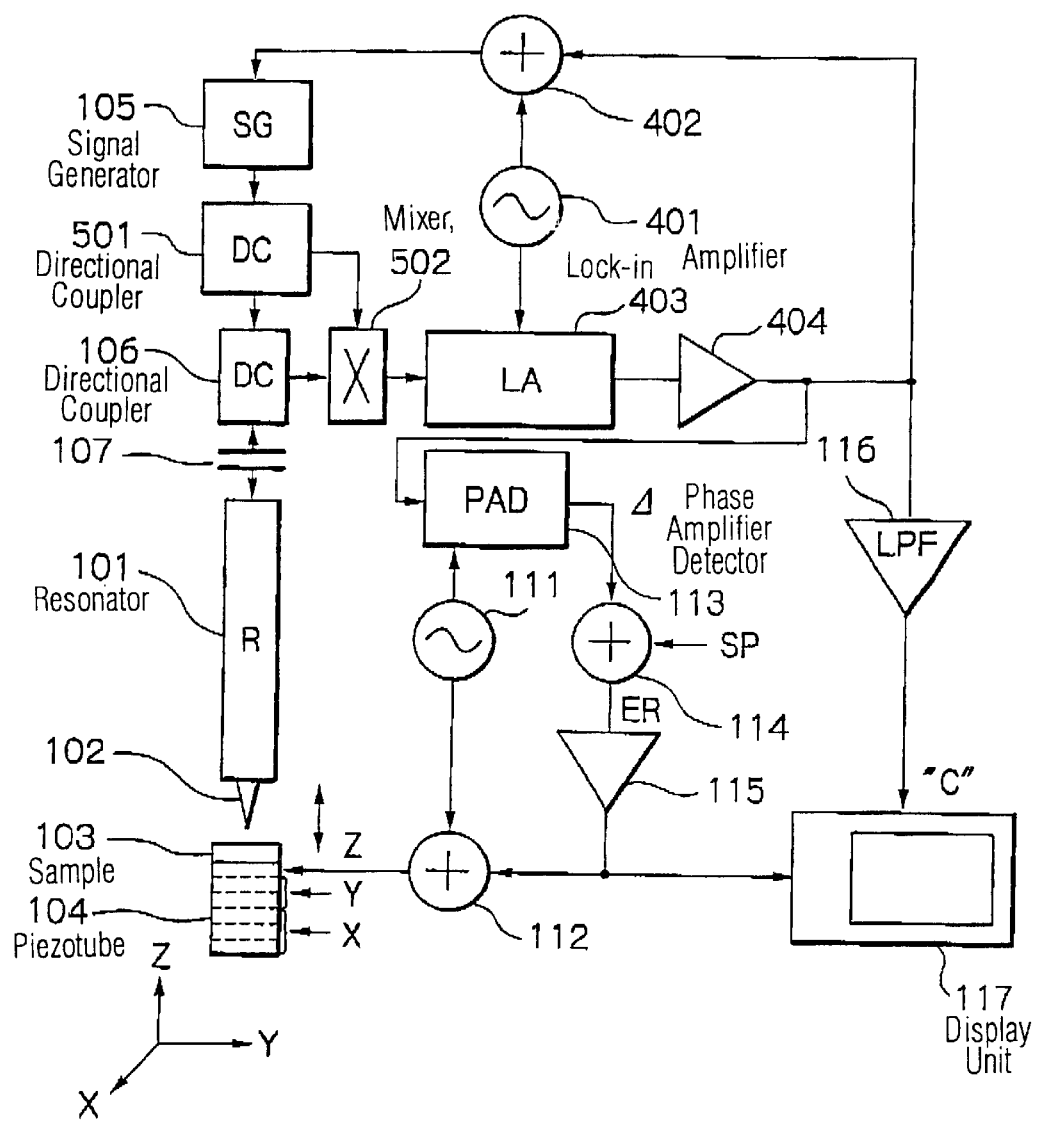
FIG. 14 is a block circuit diagram illustrating a fifth embodiment of the scanning microwave microscope according to the present invention.

In FIG. 14, which illustrates a fifth embodiment of the scanning microwave microscope according to the present invention, a directional coupler 501 serving as a power distributor is connected between the signal generator 105 and the directional coupler 1036 of FIG. 13, and a double balanced mixer (DBM) 502 is provided instead of the diode detector 108 of FIG. 13.

In the fourth embodiment as illustrated in FIG. 13, use is made of a change in the sign of the differential component of the amplitude of the reflected microwave with respect to the frequency thereof at the resonant frequency. However, this differential component may become small according to circumstances, so that it is difficult to effectively track the resonant frequency. In this fifth embodiment as illustrated in FIG. 14, this difficulty is overcome by detecting a difference in phase between a microwave excited closely at the resonant frequency and its reflected microwave.

In FIG. 14, the signal generator 105 is also a voltage controlled oscillator. A main power of the output signal generator 105 is supplied by the directional coupler 501 as an input microwave to an LO input of the mixer 502, and the remainder of the power is supplied to the directional coupler 106, the weak coupler 107, the resonator 101 and the sharp end 102 thereof. A reflected microwave from the resonant system with the sample 103 is split by the directional couple 106 and is supplied to an RF input of the mixer 502.

An IF output of the mixer 502 generates a signal regarding the difference in phase between the input microwave and the reflected microwave. The output signal of the oscillator 401 is supplied via the adder 402 to the voltage control input of the signal generator 105, to modulate the microwave output thereof. The difference in phase between the input microwave and the reflected microwave is detected in the lock-in amplifier 403 using the frequency of the oscillator 401 as a reference, and is supplied to the amplifier 404.

The output signal of the amplifier 404 is supplied via the adder 402 to the signal generator 105, to track the center of the frequency of the output signal thereof at the resonant frequency. Simultaneously, the output signal of the amplifier 404 is supplied via the low-pass filter 116 to the display unit 117, thus displaying the output signal of the amplifier 404. Additionally, the output signal of the amplifier 404 is supplied to the phase amplitude detector 113, it so that the same operation as in the first embodiment as illustrated in FIG. 1 is carried out.

The operation of the scanning microwave microscope of FIG. 14 is explained simply below.

When the phase of the LO input of the mixer 50Z coincides with that of the RF input thereof, the IF output signal of the mixer 502 is maximum. That is, the IF output signal of the mixer 502 is maximum at the center of the resonant frequency. Therefore, when a modulation is carried out at a frequency close to the resonant frequency, the sign of the output signal of the clock-in amplifier 403 changes.

Thus, a negative feedback control is carried out by using the sign of the output signal of the lock-in amplifier 403, to determine the sign of a voltage supplied to the voltage control input of the signal generator 105. When the voltage control input of the signal generator 105 is zero, the output signal of the amplifier 404 is a signal in proportion to the difference in resonant frequency between that in an open state and that in an interference state with the sample 103 while the resonant frequency can be tracked. Also, the output signal of the amplifier 404 is used for controlling the average distance z between the sharp end 102 of the resonator 101 and the sample 101 as in the first embodiment of FIG. 1.

Figure 15:
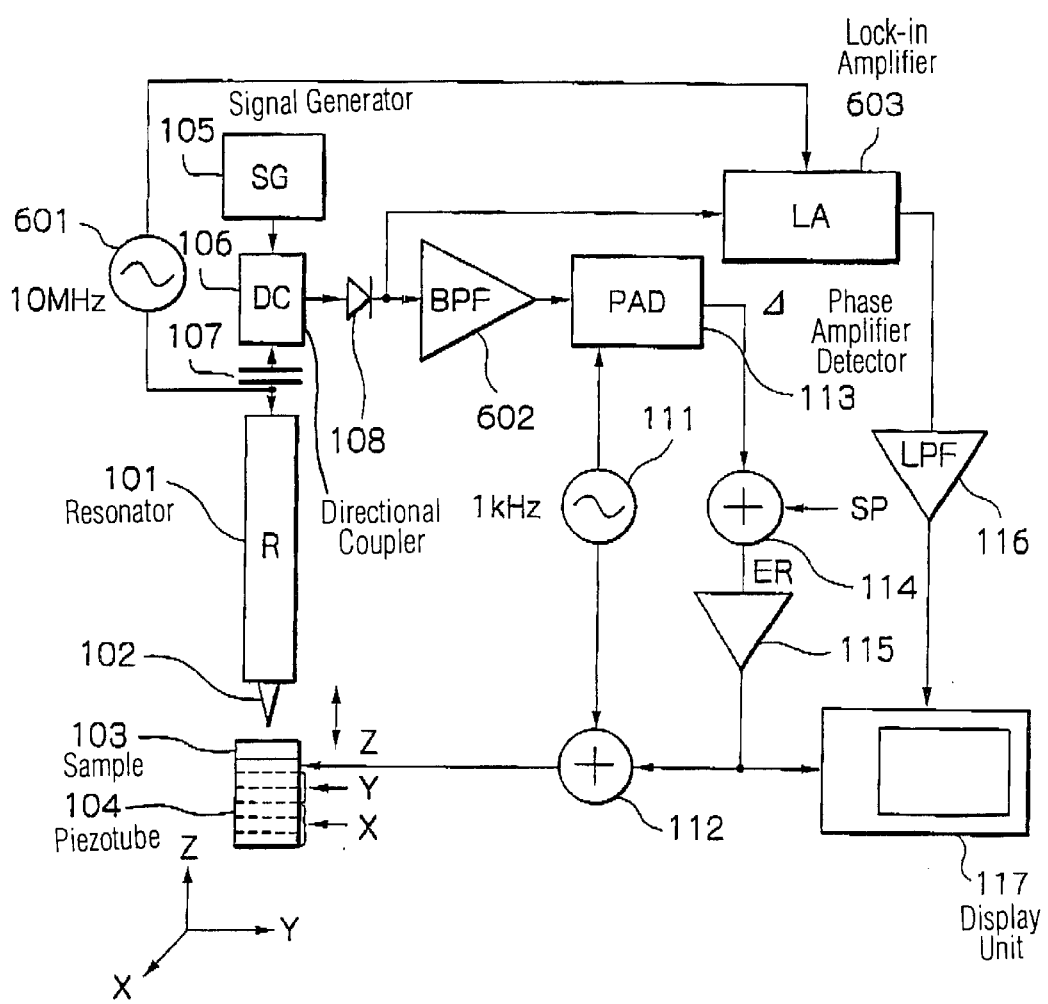
FIG. 15 is a block circuit diagram illustrating a sixth embodiment of the scanning microwave microscope according to the present invention.

In FIG. 15, which illustrates a sixth embodiment of the scanning microwave microscope according to the present invention, an oscillator 601, a band-pass filter 602 and a lock-in amplifier 603 are added to the scanning microwave microscope of FIG. 1. In FIG. 15, a bias electric field having a frequency lower than the microwave frequency is applied to the sample 103 to detect information relating to a change of the resonant state induced by the bias electric field, and this information is displayed on the display unit 117. The oscillator 601 is provided for generating the abovementioned bias electric field, and the band-pass filter 602 selects a frequency component close to the frequency of the oscillator 111.

The bias oscillator 601 preferably generates a DC component and an AC component. The output signal of the bias oscillator 601 is transmitted by a low-pass filter formed by a strip line connected to the center conductor of the resonator 101. In this case, a grounded electrode is inserted between the sample 103 and the piezotube 104. Instead of this, the center conductor of the resonator 101 can be grounded, so that the output signal of the bias oscillator is transmitted by a low-pass filter to an electrode provided between the sample 103 and the piezotube 104. The former will be explained later with reference to FIG. 16.

For the sample 103 constructed by a semiconductor device, the bias AC frequency of the bias oscillator 601 is about 1 MHz, for example, to observe a response relating to the resonant state around 1 MHz. On the other hand, the piezotube 104 is modulated by a frequency close to 10 kHz of the oscillator 111. Therefore, a DC component, a component which is changed at a frequency of about 10 kHz and a component which is changed at a frequency of about 1 MHz are superposed at the output signal of the diode detector 08.

The output signal of tho diode detector 108 is supplied to the band-pass filter 602 which, in this case, has a center frequency of about 10 KHz, so that a component in response to the differential modulation of the distance z between the sharp end 102 of the resonator 101 and the sample can be obtained at the output signal of the band-pass filter 602. Then, the difference in amplitude depending on the phases is detected by the phase amplitude detector 113. Thus, in the same way as in the first embodiment, a signal for to controlling the above-mentioned distance z can be obtained in the output of the feedback amplifier 115. On the other hand, the output signal of the diode detector 108 is detected by the lock-in amplifier 603 using the frequency of the bias oscillator 601 as a reference, so that the information relating to the change of the resonant state in response to the bias electric field can be detected. Thus, this information along the X- and Y-locations of the sample 103 as well as the topographical image can be displayed on the display unit 117.

In FIG. 15, note that a bias magnetic field or a bias force instead of the bias electric field can be applied to the sample 103.

Figure 16:
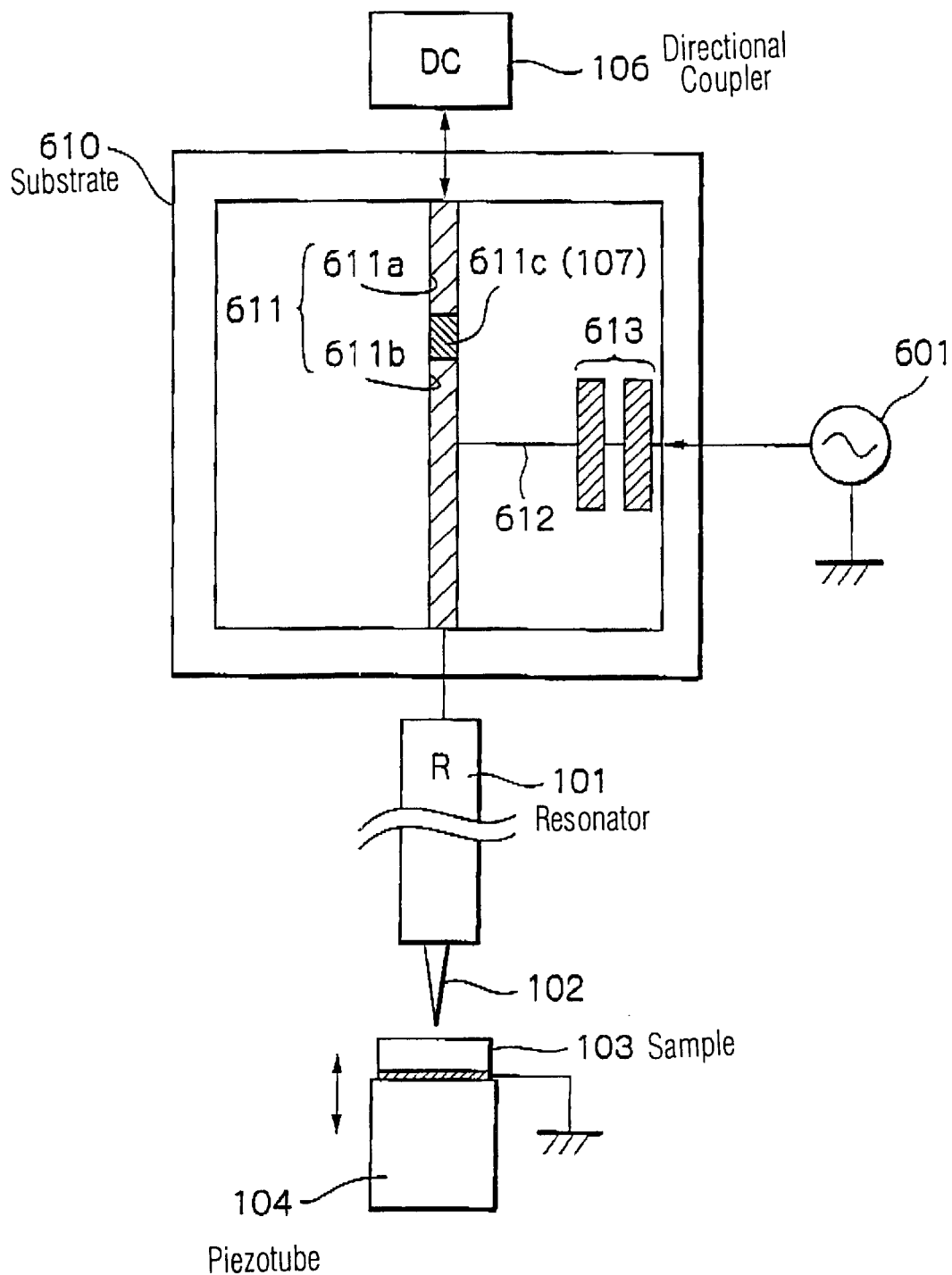
FIG. 16 is a circuit diagram of connections between the directional coupler, the resonator and the bias oscillator of FIG. 15.

In FIG. 16, which illustrates connections among the directional coupler 106, the resonator 101 and the bias oscillator 601 of FIG. 15, reference numeral 610 designates a substrate made of fluorocarbon polymer on which a thick strip line having an impedance of about 50Ω and a thin strip line 612 having an impedance about ten to twenty times that of the strip line 611 are formed. The strip line 611 is divided into two portions 611a and 611b by a cut portion 611c serving as the weak coupler 107. In this case, the cut portion 611c has a capacitance of less than 1pF. The first portion 611a is connected to the directional coupler 106, while the second portion 611b is connected to the resonator 101 and also, is connected via the strip line 612 to the bias oscillator 601. Further, a capacitance element 613 formed by stubs is formed at the strip line 612 to form a low-pass filter between the second portion 611b and the bias oscillator 601. Thus, signals having a frequency of toss than 0.5 GHz can pass through this low-pass filter.

In the above-described embodiments, although the modulation of the frequency of the resonator 101 is sinusoidal, this modulation can be rectangular, saw tooth or triangular.

Figure 17:
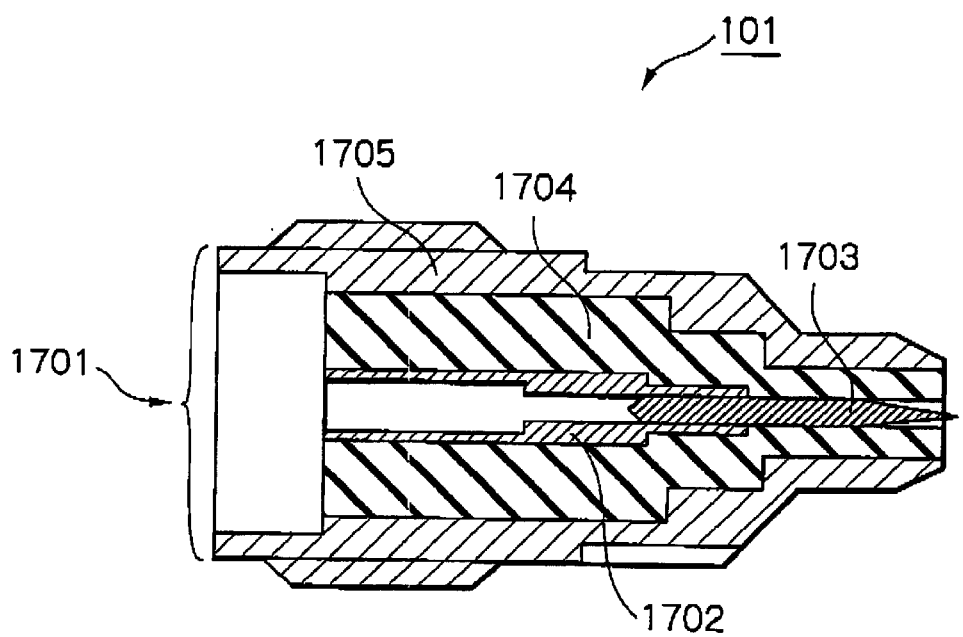
FIG. 17 is a cross-sectional view of the resonator of FIGS. 1, 9, 11, 13, 14 and 15.

In FIG. 17, which illustrates the resonator 101 of FIGS. 1, 9, 11, 13, 14 and 15, reference numeral 1701 designates a connector to which a fitting metal section 1702 is fixed. A probe 1703 having a length of about 10 mm and a diameter of 0.5 mm is inserted into the fitting metal section 1702. In this case, the probe 1703 serves as the center conductor of the resonator 101. Note that the probe 1703 is manufactured by performing an electrochemical etching operation upon a metal wire made of tungsten or the like. The fitting metal section 1702 and the probe 1703 are enveloped by a fluorocarbon polymer layer 1704 which is also enveloped by an external conductor 1705. The external conductor 1705 is fixed to the connector 1701.

Note that the probe 1703 of FIG. 17 corresponds to the sharp end 102 of the resonator 101.

In FIG. 17, since the probe 1703 has a smooth step, the probe 1703 can be easily observed from the outside so that the probe 1703 is replaceable. Actually, since the probe 1703 is abraded, a structure for easily replacing one probe with another is indispensable.

In FIG. 17, although the resonator 101 is of a coaxial cable type, the resonator 101 can be of a coplanar coaxial waveguide type or a strip line coaxial waveguide type.

In FIG. 17, a line section is constructed by the elements 1701 to 1705 except for the probe 1703. Also, at least the probe 1703 and a sample are under a pressure-controlled atmosphere such as a vacuum state or an ultra-high vacuum state or a temperature-controlled atmosphere such as a cryostat.

As explained hereinabove, according to the present invention, it is possible to precisely control the distance between the sharp end of a microwave resonator and a sample at a definite value, thus realizing a high resolution.

Also, in a microwave resonator, since the sharp end thereof, i.e., a probe can be easily observed from the outside, when the probe is abraded, the probe can be easily replaced with another, thus always maintaining a sharp probe, which also realizes a high resolution.

What is claimed:

1. A scanning microwave microscope comprising:
   a microwave resonator;
   an exciting unit for exciting said microwave resonator;
   a first detecting unit for detecting a first detection amount relating to a resonant state of said microwave resonator;
   a sharp end coupled to a center conductor of said microwave resonator;
   a display unit for displaying said first detection amount while a sample is scanned by said sharp end;
   a distance changing unit for causing a differential change in a distance between said sharp end and said sample;
   a second detecting unit for detecting a second detection amount relating to a change of said first detection amount; and
   a control unit for controlling the distance between said sharp end and said sample in accordance with said second detection amount, so that an average value of the distance between said sharp end and said sample is brought close to a definite value.

2. The scanning microwave microscope as set forth in claim 1, wherein said display unit displays control information derived from said second detection amount while said sample is scanned by said sharp end.

3. The scanning microwave microscope as set forth in claim 1, wherein said second detection amount is a difference in said first detection amount relating to a change of the distance between said sharp end and said sample.

4. The scanning microwave microscope as set forth in claim 1, wherein said second detecting unit comprises;
   a third detecting unit for detecting a third detection amount relating to an amplitude of said first detection amount at an "approaching" phase where said sharp end is approaching said sample;
   a fourth detecting unit for detecting a fourth detection amount relating to an amplitude of said first detection amount at a "departing" phase where said sharp end is departing from said sample; and
   a fifth detection unit for detecting a fifth detection amount relating to a difference between said third and fourth detection amounts,
   said control unit controlling the distance between said sharp end and said sample in accordance with said fifth detection amount.

5. The scanning microwave microscope as set forth in claim 4, wherein said third detecting unit detects an approaching initial value of said first detection amount at a starting timing of said "approaching" phase, detects differences between said approaching initial value and said first detection amount at timings of said "approaching" phase, and detects an average value of said differences as said third detection amount,
   said third detecting unit detecting a departing initial value of said first detection amount at a starting timing of said "departing" phase, detecting differences between said departing initial value and said first detection amount at timings of said "departing" phase, and detecting an average value of said differences as said fourth detection amount.

6. The scanning microwave microscope as set forth in claim 4, wherein said third and fourth detection units comprise;
   a sample/hold circuit for sampling an initial value of said first detection amount at a starting timing of one of said "approaching" phase and said "departing" phase;
   a differential amplifier for detecting differences along with polarities between said initial value and said first detection amount at timings of said one of said "approaching" phase and said "departing" phase; and
   an average circuit for calculating an average value of said differences along with polarities.

7. The scanning microwave microscope as set forth in claim 4, wherein said third detecting unit detects an average value of amplitudes detected at said "approaching" phase, and said fourth detecting unit detects an average value of amplitudes detected at said "departing" phase,
   said fifth detecting unit detecting a difference between the average value of amplitudes at said "approaching" phase and the average value of amplitudes at said "departing" phase as said fourth detection amount.

8. The scanning microwave microscope as set forth in claim 4, wherein said third and fourth detection units comprise:
   a sample/hold circuit for sampling an initial value of said first detection amount at a starting timing of one of said "approaching" phase and said "departing" phase;
   a first differential amplifier for detecting differences along with polarities between said initial value and said first detection amount at timings of said one of said "approaching" phase and said "departing" phase;
   a switching circuit, connected to said first differential amplifier and having first and second output terminals, for switching an output signal of said first differential amplifier to said first and second output terminals in accordance with said "approaching" phase and said "departing" phase;
   a first average circuit, connected to the first output terminal of said first differential amplifier, for calculating a first average value of said differences at said "approaching" phase; and
   a second average circuit, connected to the second output terminal of said first differential amplifier, for calculating a second average value of said differences at said "departing" phase,
   said fifth detection unit comprising a second differential amplifier, connected to said first and second average circuits, for calculating a difference between said first and second average values.

9. The scanning Microwave microscope as set forth in claim 1, wherein said second detecting unit calculates first and second differences of said first detection amount relating to the distance between said sharp end and said sample, and calculates a ratio or a third difference between said first and second differences,
   said control unit controlling the distance between said sharp end and said sample in accordance with said ratio or said third difference, so that said ratio or said third difference is brought close to a definite value.

10. The scanning microwave microscope as set forth in claim 1, wherein said distance changing unit comprises;
    a first oscillator for supplying a frequency signal for vibrating said sample; and
    a sixth detecting unit for detecting a signal relating to a change in the resonant state of said microwave resonator in synchronization with the frequency of said first oscillator,
    said control unit controlling the distance between said sharp end and said sample in accordance with the signal detected by said sixth detecting unit.

11. The scanning microwave microscope as set forth in claim 10, further comprising a second oscillator having a frequency lower than the frequency of said first oscillator, so that the signal relating to the change of the resonant state of said microwave resonator is modulated by the frequency of said second oscillator.

12. The scanning microwave microscope as set forth in claim 11, wherein said distance changing unit causes the differential change $\Delta z$ in the distance between said sharp end and said sample by $$\Delta z = a \cdot \sin \omega t (1 + b \cdot \sin \Omega t)$$

wherein a and b are constants;

$\omega$ and $\Omega$ are angular frequencies ($\Omega \gg \omega$); and t is a time, said second detecting unit comprising a lock-in amplifier for detecting said second detection amount using said angular frequency $\Omega$, so that said control unit controls the distance between said sharp end and said sample in accordance with an output signal of said lock-in amplifier.

13. The scanning microwave microscope as set forth in claim 1, wherein said distance changing unit comprises a digital/analog converter for converting first digital data into first analog data for causing the differential change in the distance between said sharp end and said sample, said second detecting unit comprising an analog/digital converter for converting analog data relating to the resonant state of said microwave resonator, said scanning microwave microscope further comprising a digital signal processor connected to said digital/analog converter and said analog/digital converter, for generating said first digital data and receiving said second digital data, for controlling the distance between said sharp end and said sample in accordance with one of differences between said second digital data, a ratio of said differences and a difference of said differences so that an average value of the distance between said sharp end and said sample is brought close to a definite value.

14. The scanning microwave microscope as set forth in claim 13, wherein said digital signal processor transmits first digital data z1, z2, and z3 (z1>z2>z3) to said digital/analog converter and receives second digital data y1, y2 and y3 from said analog/digital converter in response to the first digital data z1, z2 and z3, respectively, then, calculates the following differences:

$$A21 = (y2-y1)/(z2-z1)$$

$$A32 = (y3-y2)/(z3-z2)$$

then, calculates the following ratio:

$$A = A32/A31$$

then, compares the ratio A with a constant $\alpha$ close to 1, so that said digital signal processor controls an average distance between said sharp end and said sample, so that the ratio A is brought close to $\alpha$.

15. The scanning microwave microscope as set forth in claim 13, wherein said digital signal processor transmits first digital data z1, z2, and z3 (z1>z2>z3) to said digital/analog converter and receives, second digital data y1, y2 and y3 from said analog/digital converter in response to the first digital data z1, z2 and z3, respectively, then, calculates the following differences;

$$A21 = (y2-y1)/(z2-z1)$$

$$A32 = (y3-y2)/(z3-z2)$$

then, calculates the following difference;

$$B = A32 - A31$$

then, compares the difference B with a constant $\beta$ close to 0, so that said digital signal processor controls an average distance between said sharp end and said sample, so that the difference B is brought close to $\beta$.

16. The scanning microwave microscope as set forth in claim 15, wherein said distance changing unit comprises a conversion element for converting an electrical signal into a displacement of said sharp end with respect to said sample.

17. The scanning microwave microscope as set forth in claim 16, wherein said conversion element comprises a piezoelectric element at its end to cause a differential displacement of said sharp end so that the differential change is caused in the distance between said sharp end and said sample.

18. The scanning microwave microscope as set forth in claim 16, wherein said distance changing unit comprises a piezoelectric element provided in a structure for holding said sample, so that a deformation of said piezoelectric element causes the differential change in the distance between said sharp end and said sample.

19. The scanning microwave microscope as set forth in claim 16, wherein said conversion element is operated to cause the differential change in the distance between said sharp end and said sample and to control an average distance between said sharp end and said sample.

20. The scanning microwave microscope as set forth in claim 1, wherein said exciting unit comprises:

a modulating unit for modulating a microwave frequency of said microwave resonator; and a detecting unit for detecting a change in an amount relating to the resonant state of said microwave resonator in accordance with the modulated microwave frequency of said microwave resonator, so that the change in the amount relating to the resonant state of said microwave resonator is brought close to a small frequency width centered at the resonant frequency of said microwave resonator.

21. The scanning microwave microscope as set forth in claim 20, wherein a modulation of the microwave frequency of said microwave resonator is periodic.

22. The scanning microwave microscope as set forth in claim 20, wherein a modulation of the microwave frequency of said microwave resonator is rectangular, sinusoidal, saw tooth or triangular.

23. The scanning microwave microscope as set forth in claim 1, wherein the amount relating to the resonant state of said microwave resonator is a difference in phase between an input microwave and a reflected microwave of said microwave resonator.

24. The scanning microwave microscope as set forth in claim 23, wherein said exciting unit and said first detecting unit comprise:

a power distributor;

a directional coupler, connected between said power distributor and said microwave resonator;

a mixer connected to said power distributor and said directional coupler; and a detector connected to said mixer, said power distributor distributing a part of exciting power as said input microwave to said distributor and the remainder of said exciting power to a first input of said mixer, said directional coupler receiving a microwave reflected from said microwave resonator as the amount relating to the resonant state of said microwave resonator and transmitting the reflected microwave to a second input of said mixer, said detector detecting the difference in phase between the input microwave and the reflected microwave as the amount relating to the resonant state of said microwave resonator.

25. The scanning microwave microscope as set forth in claim 24, wherein said power distributor comprises a directional coupler.

26. The scanning microwave microscope as set forth in claim 23, wherein said exciting unit and said first detecting unit comprise:

a power distributor;

a directional coupler, connected between said power distributor and said microwave resonator;

a mixer, connected to said power distributor and said directional coupler; and a detector connected to said mixer, said power distributor distributing a part of exciting power as said input microwave to said distributor and the remainder of said exciting power to a first input of said mixer.

27. The scanning microwave microscope as set forth in claim 1, further comprising an external field applying unit for applying an external field to said sample, said external field being one of an electric field, a magnetic field and a force field.

28. The scanning microwave microscope as set forth in claim 27, wherein said first detecting unit detects the amount relating to the resonant state of said microwave resonator in synchronization with said external field.

29. The scanning microwave microscope as set forth in claim 27, wherein said external field applying unit comprises a bias circuit connected to a center conductor of said microwave resonator.

30. The scanning microwave microscope as set forth in claim 27, wherein said external field applying unit comprises an electrode provided beneath said sample and a bias circuit connected to said electrode.

31. The scanning microwave microscope as set forth in claim 30, wherein said external field is an electric field which is periodically changed at a low frequency, said first detecting unit detecting the first detection amount relating to the resonant state of said microwave resonator in synchronization with said external field.

32. A microwave microscope comprising:

a microwave resonator comprising a line section and a probe provided in said line section, said probe comprising a sharp conductive end, for scanning a sample, a first detecting unit for detecting a first detection amount relating to a resonant state of said microwave resonator;

a distance changing unit for causing a differential change in a distance between said sharp end and said sample;

a second detecting unit for detecting a second detection amount relating to a change of said first detection amount; and a control unit for controlling the distance between said sharp end and said sample in accordance with said second detection amount, so that an average value of the distance between said sharp end and said sample is brought close to a definite value.

33. The microwave microscope as set forth in claim 32, being of a cylindrical coaxial type.

34. The microwave microscope as set forth in claim 32, being of a coplanar coaxial type.

35. The microwave microscope as set forth in claim 32, being of a strip-line coaxial type.

36. A scanning microwave microscope comprising:

a microwave resonator comprising a line section, and a replaceable probe provided in said line section, said probe comprising a sharp conductive end for scanning a sample, a first detecting unit for detecting a first detection amount relating to a resonant state of said microwave resonator;

a distance changing unit for causing a differential change in a distance between said sharp end and said sample;

a second detecting unit for detecting a second detection amount relating to a change of said first detection amount; and a control unit for controlling the distance between said sharp end and said sample in accordance with said second detection amount, so that an average value of the distance between said sharp end and said sample is brought close to a definite value.

37. The scanning microwave microscope as set forth in claim 36, wherein said microwave resonator is of a cylindrical coaxial type, of a coplanar coaxial type or of a strip-line coaxial type.

38. The scanning microwave microscope as set forth in claim 36, wherein said microwave resonator is of a strip-line coaxial type.

39. The scanning microwave microscope as set forth in claim 36, wherein at least said probe and a sample are under a pressure-controlled atmosphere such as a vacuum state or an ultra-high vacuum state.

40. The scanning microwave microscope as set forth in claim 36, wherein at least said probe and a sample are under a temperature-controlled atmosphere such as a cryostat.

* * * * *